(12) United States Patent
Dua et al.

(10) Patent No.: US 12,522,960 B2
(45) Date of Patent: Jan. 13, 2026

(54) KNIT COMPONENT BONDING

(71) Applicant: NIKE, Inc., Beaverton, OR (US)

(72) Inventors: Bhupesh Dua, Portland, OR (US); Karen A. Hawkinson, Portland, OR (US); Benjamin A. Shaffer, Saratoga, CA (US)

(73) Assignee: NIKE, Inc., Beaverton, OR (US)

( * ) Notice: Subject to any disclaimer, the term of this patent is extended or adjusted under 35 U.S.C. 154(b) by 31 days.

(21) Appl. No.: 18/200,090

(22) Filed: May 22, 2023

(65) Prior Publication Data

US 2023/0287608 A1   Sep. 14, 2023

Related U.S. Application Data

(60) Division of application No. 17/521,164, filed on Nov. 8, 2021, now Pat. No. 11,692,289, which is a
(Continued)

(51) Int. Cl.
*D04B 1/16* (2006.01)
*A43B 1/04* (2022.01)
(Continued)

(52) U.S. Cl.
CPC ............... *D04B 1/16* (2013.01); *A43B 1/04* (2013.01); *A43B 23/0205* (2013.01); *D04B 1/24* (2013.01);
(Continued)

(58) Field of Classification Search
CPC .. D04B 21/16; D04B 1/16; D04B 1/24; A43B 1/04; D10B 2403/0114; D10B 2501/043
See application file for complete search history.

(56) References Cited

U.S. PATENT DOCUMENTS

| 601,192 A | 3/1898 | Woodside |
| 1,215,198 A | 2/1917 | Rothstein |
(Continued)

FOREIGN PATENT DOCUMENTS

| CN | 1084719 A | 4/1994 |
| CN | 2275378 Y | 3/1998 |
(Continued)

OTHER PUBLICATIONS

Declaration and Curriculum Vitae of Dr. Edward C. Frederick, Exhibit 1001 in IPR2013-00067, Nov. 28, 2012, 178 pages.
(Continued)

*Primary Examiner* — Danny Worrell
(74) *Attorney, Agent, or Firm* — SHOOK, HARDY & BACON L.L.P.

(57) ABSTRACT

An article may include first and second components comprising non-woven textiles and a third component positioned between the first two components. A first surface of the third component that is adjacent the first component comprises a thermoplastic polymer material, and the third component is fused with a first region of the first component and unfused with a second region of the first component. A method of manufacturing the article, which may be an article of wear, includes arranging the components to form a stacked configuration so that the third component is positioned between the first and second components. Heat and compression may be applied to at least a first region of the first component to fuse the first region with the third component, whereas a second region of the first component may remain unfused to the second component.

9 Claims, 28 Drawing Sheets

Related U.S. Application Data continuation of application No. 16/129,248, filed on Sep. 12, 2018, now Pat. No. 11,203,823, which is a continuation of application No. 14/845,979, filed on Sep. 4, 2015, now Pat. No. 10,094,053, which is a division of application No. 13/100,689, filed on May 4, 2011, now Pat. No. 9,150,986.

(51) Int. Cl.
*A43B 23/02* (2006.01)
*D04B 1/24* (2006.01)
*D04B 21/16* (2006.01)

(52) U.S. Cl.
CPC ........ *D04B 21/16* (2013.01); *D10B 2401/041* (2013.01); *D10B 2403/0114* (2013.01); *D10B 2501/043* (2013.01); *Y10T 442/40* (2015.04)

(56) References Cited

U.S. PATENT DOCUMENTS

| | | |
|---|---|---|
| 1,597,934 A | 8/1926 | Stimpson |
| 1,888,172 A | 11/1932 | Joha |
| 1,902,780 A | 3/1933 | Holden et al. |
| 1,910,251 A | 5/1933 | Joha |
| 2,001,293 A | 5/1935 | Wallace |
| 2,047,724 A | 7/1936 | Zuckerman |
| 2,147,197 A | 2/1939 | Glidden |
| 2,308,593 A | 1/1943 | Edmund |
| 2,314,098 A | 3/1943 | Raymond |
| 2,330,199 A | 9/1943 | Holmes |
| 2,343,390 A | 3/1944 | Ushakoff |
| 2,400,692 A | 5/1946 | Herbert |
| 2,440,393 A | 4/1948 | Clark |
| 2,569,764 A | 10/1951 | Jonas |
| 2,586,045 A | 2/1952 | John |
| 2,608,078 A | 8/1952 | Anderson |
| 2,641,004 A | 6/1953 | Whiting et al. |
| 2,675,631 A | 4/1954 | Carr |
| 2,811,029 A | 10/1957 | Conner |
| 3,457,739 A | 7/1969 | Frand et al. |
| 3,583,081 A | 6/1971 | Hayashi |
| 3,620,892 A | 11/1971 | Wincklhofer et al. |
| 3,669,157 A | 6/1972 | Woodall et al. |
| 3,694,940 A | 10/1972 | Stohr |
| 3,704,474 A | 12/1972 | Winkler |
| 3,766,566 A | 10/1973 | Tadokoro |
| 3,778,856 A | 12/1973 | Chriestie et al. |
| 3,796,066 A | 3/1974 | Millar |
| 3,821,012 A | 6/1974 | Lattarulo et al. |
| 3,911,499 A | 10/1975 | Benevento et al. |
| 3,952,427 A | 4/1976 | Von et al. |
| 3,972,086 A | 8/1976 | Belli et al. |
| 4,027,402 A | 6/1977 | Liu et al. |
| 4,031,586 A | 6/1977 | Von et al. |
| 4,211,806 A | 7/1980 | Civardi et al. |
| 4,255,949 A | 3/1981 | Thorneburg |
| 4,317,292 A | 3/1982 | Melton |
| 4,320,634 A | 3/1982 | Hashimoto et al. |
| 4,372,998 A | 2/1983 | Shimada |
| 4,373,361 A | 2/1983 | Thorneburg |
| 4,447,967 A | 5/1984 | Zaino |
| 4,450,196 A | 5/1984 | Kamat |
| 4,465,448 A | 8/1984 | Aldridge |
| 4,607,439 A | 8/1986 | Sogabe et al. |
| 4,733,545 A | 3/1988 | Weinle et al. |
| 4,737,396 A | 4/1988 | Kamat |
| 4,750,339 A | 6/1988 | Simpson et al. |
| 4,756,098 A | 7/1988 | Boggia |
| 4,785,558 A | 11/1988 | Shiomura |
| 4,813,158 A | 3/1989 | Brown |
| 4,842,661 A | 6/1989 | Miller et al. |
| 5,095,720 A | 3/1992 | Tibbals, Jr. |
| 5,152,025 A | 10/1992 | Hirmas |
| 5,158,636 A | 10/1992 | Groitzsch et al. |
| 5,192,601 A | 3/1993 | Neisler |
| 5,345,638 A | 9/1994 | Nishida |
| 5,353,524 A | 10/1994 | Brier |
| 5,461,884 A | 10/1995 | Mccartney et al. |
| 5,511,323 A | 4/1996 | Dahlgren |
| 5,572,860 A | 11/1996 | Mitsumoto et al. |
| 5,575,090 A | 11/1996 | Condini |
| 5,729,918 A | 3/1998 | Smets |
| 5,735,145 A | 4/1998 | Pernick |
| 5,746,013 A | 5/1998 | Fay, Sr. |
| 5,888,609 A | 3/1999 | Karttunen et al. |
| 5,889,229 A | 3/1999 | Sosnowski |
| 5,945,357 A | 8/1999 | Quigley |
| 5,972,477 A | 10/1999 | Kim et al. |
| 6,027,615 A | 2/2000 | Davenport et al. |
| 6,071,578 A | 6/2000 | Richardson et al. |
| 6,308,438 B1 | 10/2001 | Throneburg et al. |
| 6,333,105 B1 | 12/2001 | Tanaka et al. |
| 6,397,638 B1 | 6/2002 | Roell |
| 6,462,267 B1 | 10/2002 | Spies et al. |
| 6,558,784 B1 | 5/2003 | Norton et al. |
| 6,588,237 B2 | 7/2003 | Cole et al. |
| 6,696,122 B1 | 2/2004 | Deschamps |
| 6,726,809 B2 | 4/2004 | Joyce et al. |
| 6,910,288 B2 | 6/2005 | Dua |
| 6,931,762 B1 | 8/2005 | Dua |
| 7,047,668 B2 | 5/2006 | Burris et al. |
| 7,051,460 B2 | 5/2006 | Orei et al. |
| 7,056,402 B2 | 6/2006 | Koerwien et al. |
| 7,270,151 B2 | 9/2007 | Nagura et al. |
| 7,347,011 B2 | 3/2008 | Dua et al. |
| 7,347,229 B2 | 3/2008 | Glenn et al. |
| 7,682,219 B2 | 3/2010 | Falla |
| 7,770,307 B2 | 8/2010 | Meschter |
| 7,779,654 B2 | 8/2010 | Garus |
| 7,820,569 B2 | 10/2010 | Hwang et al. |
| 7,823,420 B2 | 11/2010 | Andrieu et al. |
| 7,870,681 B2 | 1/2011 | Meschter |
| 7,932,194 B2 | 4/2011 | Bader et al. |
| 7,975,404 B2 | 7/2011 | Goldberg |
| 8,028,440 B2 | 10/2011 | Sokolowski et al. |
| 8,058,188 B2 | 11/2011 | Salitsky et al. |
| 8,074,375 B2 | 12/2011 | Longuet |
| 8,088,698 B2 | 1/2012 | Polegato |
| 8,252,705 B2 | 8/2012 | King et al. |
| 8,312,644 B2 | 11/2012 | Peikert et al. |
| 8,490,299 B2 | 7/2013 | Dua et al. |
| 8,800,172 B2 | 8/2014 | Dua et al. |
| 9,107,459 B2 | 8/2015 | Mayer et al. |
| 9,150,986 B2 | 10/2015 | Dua et al. |
| 10,094,053 B2 * | 10/2018 | Dua .................. D04B 1/24 |
| 11,203,823 B2 * | 12/2021 | Dua .................. D04B 1/24 |
| 11,692,289 B2 * | 7/2023 | Dua .................. D04B 1/16 12/146 D |
| 2002/0078599 A1 | 6/2002 | Delgorgue et al. |
| 2002/0148258 A1 | 10/2002 | Cole et al. |
| 2003/0126762 A1 | 7/2003 | Tseng |
| 2003/0191427 A1 | 10/2003 | Jay et al. |
| 2004/0118018 A1 | 6/2004 | Dua |
| 2005/0081402 A1 | 4/2005 | Orel et al. |
| 2005/0115284 A1 | 6/2005 | Dua |
| 2005/0193592 A1 | 9/2005 | Dua et al. |
| 2005/0284000 A1 | 12/2005 | Kerns |
| 2006/0048413 A1 | 3/2006 | Sokolowski et al. |
| 2007/0180730 A1 | 8/2007 | Greene et al. |
| 2007/0294920 A1 | 12/2007 | Baychar |
| 2008/0014817 A1 | 1/2008 | Zafiroglu et al. |
| 2008/0017294 A1 | 1/2008 | Bailey et al. |
| 2008/0110048 A1 | 5/2008 | Dua et al. |
| 2008/0189830 A1 | 8/2008 | Egglesfield |
| 2008/0313939 A1 | 12/2008 | Ardill |
| 2009/0047496 A1 | 2/2009 | Hansen |
| 2009/0049870 A1 | 2/2009 | Garus |
| 2009/0068908 A1 | 3/2009 | Hinchcliff |
| 2009/0126225 A1 | 5/2009 | Jarvis |
| 2010/0018075 A1 | 1/2010 | Meschter et al. |
| 2010/0037483 A1 | 2/2010 | Meschter et al. |
| 2010/0051132 A1 | 3/2010 | Glenn |
| 2010/0154256 A1 | 6/2010 | Dua |

(56) References Cited

U.S. PATENT DOCUMENTS

| | | |
|---|---|---|
| 2010/0167617 A1 | 7/2010 | Sato et al. |
| 2010/0170651 A1 | 7/2010 | Scherb et al. |
| 2010/0229429 A1 | 9/2010 | Longuet |
| 2010/0251491 A1 | 10/2010 | Dojan et al. |
| 2011/0078921 A1 | 4/2011 | Greene et al. |
| 2011/0088285 A1 | 4/2011 | Dojan et al. |
| 2012/0023778 A1 | 2/2012 | Dojan et al. |
| 2012/0246973 A1 | 10/2012 | Dua |
| 2012/0255201 A1 | 10/2012 | Little |
| 2012/0279260 A1 | 11/2012 | Dua et al. |
| 2013/0243985 A1 | 9/2013 | Furuta et al. |
| 2014/0130270 A1 | 5/2014 | Baudouin et al. |
| 2016/0058101 A1 | 3/2016 | Dua et al. |
| 2019/0010638 A1 | 1/2019 | Dua et al. |
| 2020/0291553 A1 | 9/2020 | Dua et al. |
| 2020/0291554 A1 | 9/2020 | Dua et al. |
| 2022/0056621 A1 | 2/2022 | Dua et al. |

FOREIGN PATENT DOCUMENTS

| | | |
|---|---|---|
| CN | 2598391 Y | 1/2004 |
| CN | 1518910 A | 8/2004 |
| CN | 1637187 A | 7/2005 |
| CN | 201263419 Y | 7/2009 |
| DE | 1084173 B | 6/1960 |
| DE | 237190 A1 | 7/1986 |
| DE | 294057 A5 | 9/1991 |
| DE | 19738433 A1 | 4/1998 |
| DE | 19728848 A1 | 1/1999 |
| DE | 102012206062 A1 | 10/2013 |
| EP | 0119754 A2 | 9/1984 |
| EP | 0448714 A1 | 10/1991 |
| EP | 0728860 A1 | 8/1996 |
| EP | 0758693 A1 | 2/1997 |
| EP | 1233091 A1 | 8/2002 |
| EP | 2649898 A1 | 10/2013 |
| EP | 2805638 A1 | 11/2014 |
| EP | 2649898 B1 | 6/2018 |
| FR | 2171172 A1 | 9/1973 |
| GB | 538865 A | 8/1941 |
| GB | 1273524 A | 5/1972 |
| GB | 1588309 A | 4/1981 |
| GB | 1603487 A | 11/1981 |
| IL | 32732 A | 2/1973 |
| JP | 49-13947 A | 2/1974 |
| JP | 1-153923 A | 6/1989 |
| JP | 6-113905 A | 4/1994 |
| JP | 8-3877 A | 1/1996 |
| JP | 8-109553 A | 4/1996 |
| JP | 9-56409 A | 3/1997 |
| JP | 10-130991 A | 5/1998 |
| JP | 11-170461 A | 6/1999 |
| JP | 11-302943 A | 11/1999 |
| JP | 2005-344225 A | 12/2005 |
| JP | 2008-114382 A | 5/2008 |
| JP | 49-13947 B2 | 1/2012 |
| NL | 7304678 A | 10/1974 |
| WO | 90/03744 A1 | 4/1990 |
| WO | 97/38037 A1 | 10/1997 |
| WO | 97/38060 A1 | 10/1997 |
| WO | 00/32744 A1 | 6/2000 |
| WO | 00/32861 A1 | 6/2000 |
| WO | 01/12896 A1 | 2/2001 |
| WO | 02/31247 A1 | 4/2002 |
| WO | 2005/052235 A1 | 6/2005 |
| WO | 2007/014145 A1 | 2/2007 |
| WO | 2012/125490 A2 | 9/2012 |
| WO | 2012/151408 A2 | 11/2012 |

OTHER PUBLICATIONS

Letter from Bruce Huffa, Dec. 23, 2013, 71 pages.
Eberle et al., "Clothing Technology", Sixth German Edition and Third English Edition, Petitioner adidas AG—Exhibit 1013, 2002, 3 pages.
Spencer, DavidJ. , "Knitting Technology, a comprehensive handbook and practical guide", Third Edition, Woodhead Publishing Limited, Petitioner adidas AG—Exhibit 1012, 2001, 413 pages.
European search report received for European Application No. 23205688.7, mailed on Feb. 5, 2024, 10 pages.
Intention to Grant received for European Patent Application No. 19214782.5, mailed on Jun. 13, 2023, 10 pages.
Extended European Search Report received for European Patent Application No. 25192327.2, mailed on Oct. 27, 2025, 12 pages.

* cited by examiner

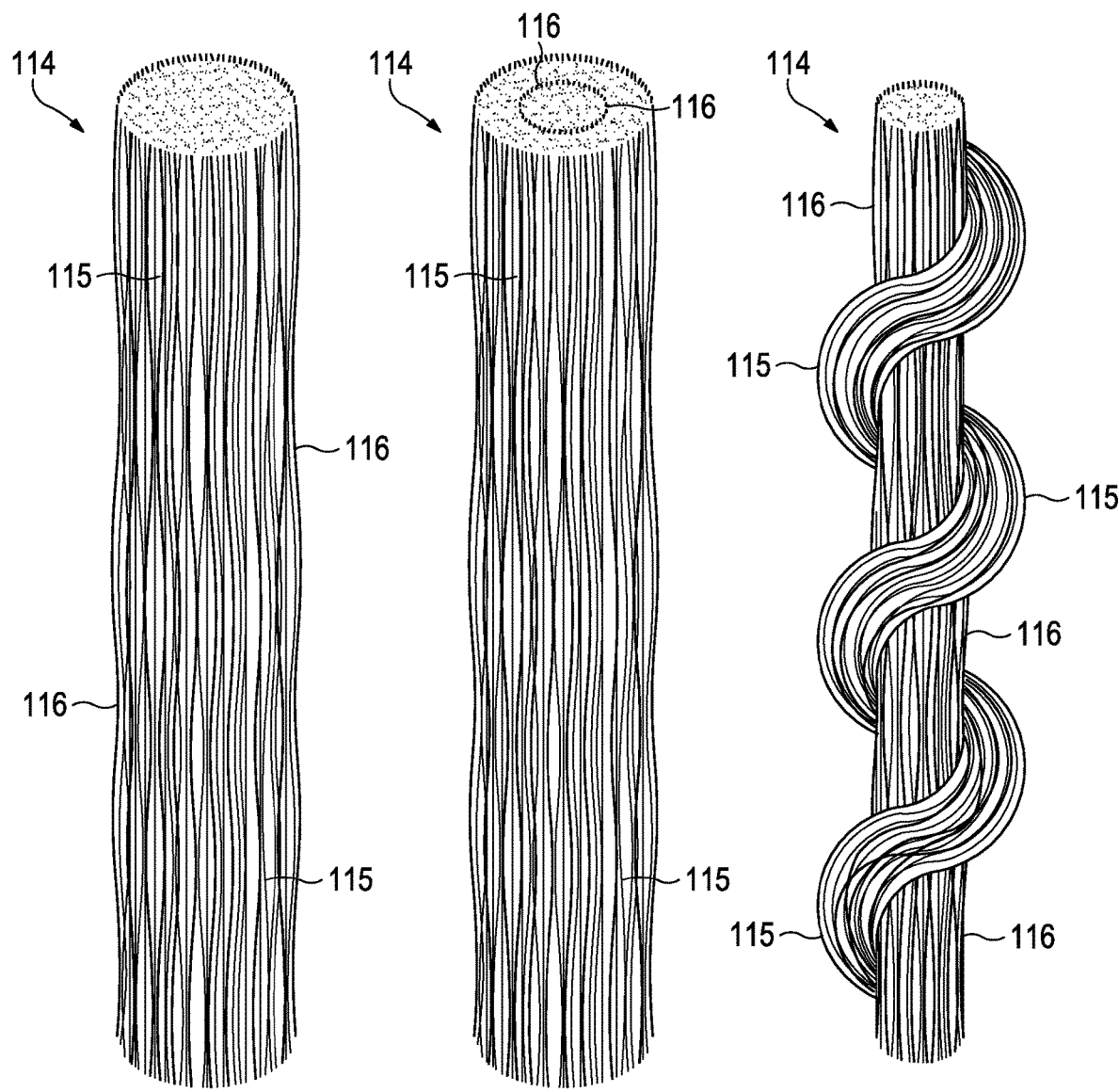
Figure 5A  Figure 5B  Figure 5C

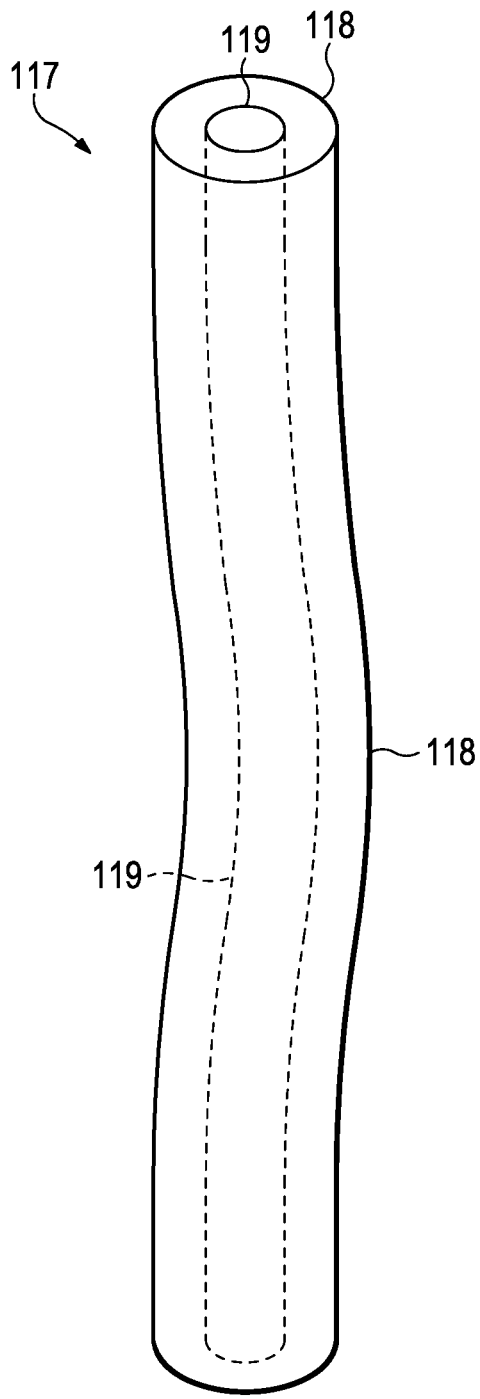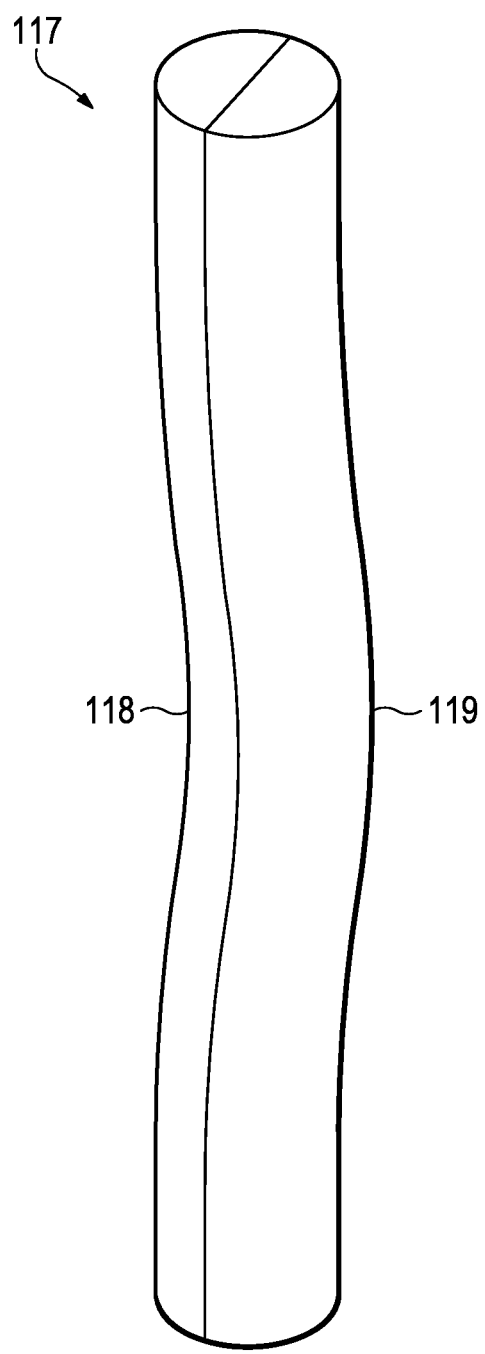
Figure 6A  Figure 6B

KNIT COMPONENT BONDING

CROSS REFERENCE TO RELATED APPLICATION

This application is a divisional application of U.S. patent application Ser. No. 17/521,164 (filed Nov. 8, 2021), which is a continuation of U.S. patent application Ser. No. 16/129,248 (filed Sep. 12, 2018), which is a continuation of U.S. patent application Ser. No. 14/845,979 (filed Sep. 4, 2015 and now U.S. Pat. No. 10,094,053), which is a divisional application of U.S. patent application Ser. No. 13/100,689 (filed May 4, 2011 and now U.S. Pat. No. 9,150,986). Each of the aforementioned applications is incorporated herein by reference in its entirety.

BACKGROUND

Knit components having a wide range of knitted structures, materials, and properties may be utilized in a variety of products. As examples, knit components may be utilized in apparel (e.g., shirts, pants, socks, jackets, undergarments, footwear), athletic equipment (e.g., golf bags, baseball and football gloves, soccer ball restriction structures), containers (e.g., backpacks, bags), and upholstery for furniture (e.g., chairs, couches, car seats). Knit components may also be utilized in bed coverings (e.g., sheets, blankets), table coverings, towels, flags, tents, sails, and parachutes. Knit components may be utilized as technical textiles for industrial purposes, including structures for automotive and aerospace applications, filter materials, medical textiles (e.g. bandages, swabs, implants), geotextiles for reinforcing embankments, agrotextiles for crop protection, and industrial apparel that protects or insulates against heat and radiation. Accordingly, knit components may be incorporated into a variety of products for both personal and industrial purposes.

SUMMARY

A composite structure is disclosed below as including a knit component and a bonded component. The knit component has a first surface and an opposite second surface, and the knit component includes a fusible yarn and a non-fusible yarn that form a knitted structure. The fusible yarn is at least partially formed from a thermoplastic polymer material, and the fusible yarn is located on at least the first surface. The bonded component is positioned adjacent to the first surface, and the bonded component is thermal bonded to the first surface with the thermoplastic polymer material of the fusible yarn.

A method of manufacturing a composite element is also disclosed below. The method includes knitting a textile with a fusible yarn and a non-fusible yarn to locate the fusible yarn on at least one surface of the textile. The surface of the textile is located in contact with a bonded component. Additionally, the textile and the bonded component are heated to form a thermal bond between a thermoplastic polymer material of the fusible yarn and the bonded component.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIGS. 5A-5C are perspective views of various configurations of a fusible yarn from the knit component.

FIGS. 6A and 6B depict configurations of a filament of the fusible yarn from the knit component.

DETAILED DESCRIPTION

The following discussion and accompanying figures disclose various concepts associated with knit component bonding.

Composite Element Configuration

Figure 1:
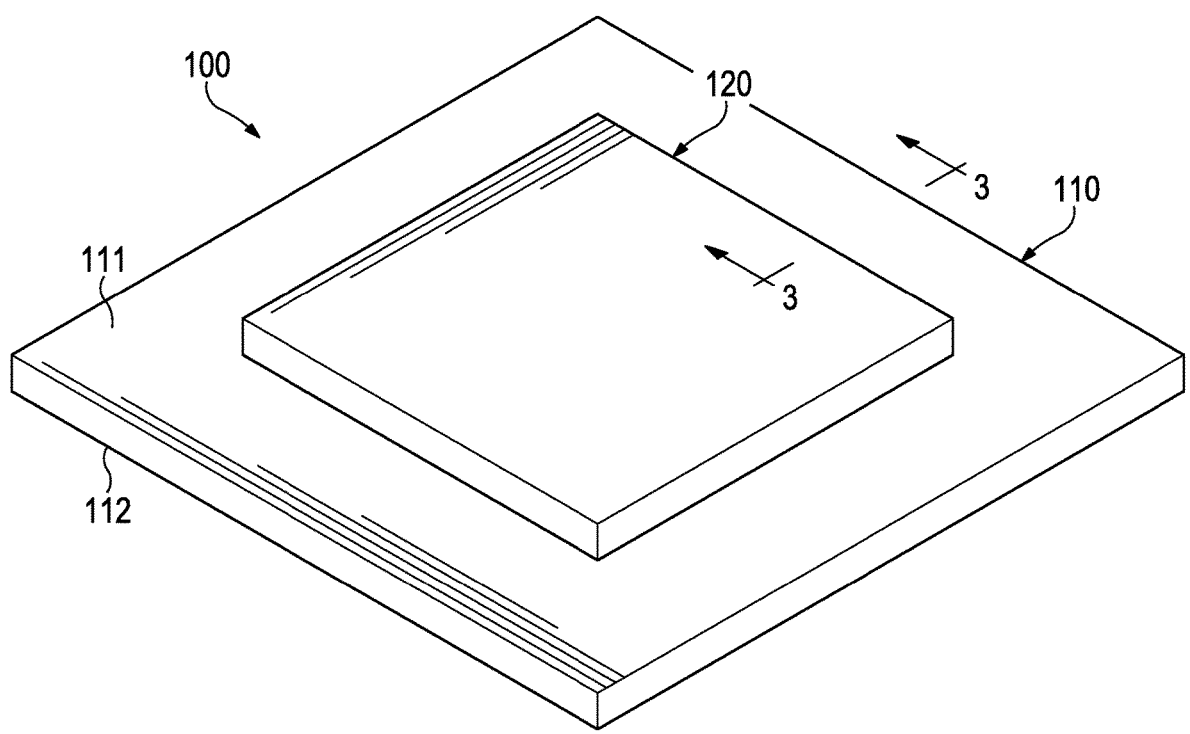
FIG. 1 is a perspective view of a composite element.
Figure 2:
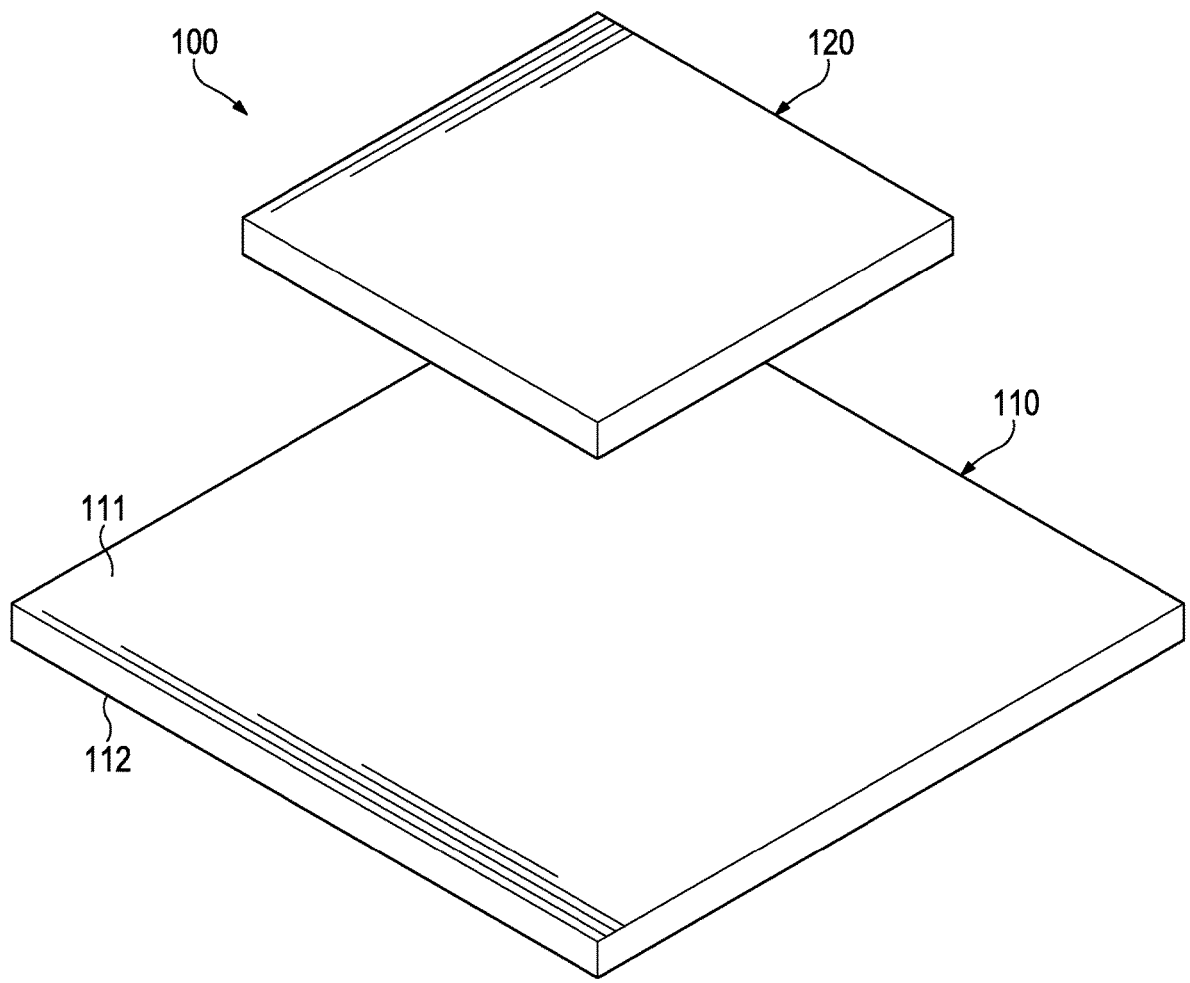
FIG. 2 is an exploded perspective view of the composite element.

A composite element 100 is depicted in FIGS. 1 and 2 as including a knit component 110 and a bonded component 120. Components 110 and 120 are secured together through knit component bonding. Although described in greater detail below, knit component bonding generally includes utilizing a fusible material (e.g., a thermoplastic polymer material) within knit component 110 to form a thermal bond that joins or otherwise secures components 110 and 120 to each other. That is, bonded component 120 is joined through thermal bonding to knit component 110 with the fusible material from knit component 110. The various configurations of composite element 100 discussed below provide examples of general configurations in which knit component bonding may be implemented. As such, the various configurations of composite element 100 may be utilized in a variety of products, including many of the products discussed in the Background above. In order to provide specific examples of the manner in which knit component bonding may be implemented, however, various articles of apparel, including a shirt 200 and an article of footwear 300, are described below.

Knit component 110 is manufactured through a knitting process to have a generally planar configuration that defines a first surface 111 and an opposite second surface 112. The knitting process forms knit component 110 from a non-fusible yarn 113 and a fusible yarn 114, as depicted in FIG.

3. That is, knit component 110 has a knitted structure in which yarns 113 and 114 are mechanically-manipulated together during the knitting process. Various types of knitting processes may be utilized to form knit component 110, including hand knitting, flat knitting, wide tube circular knitting, narrow tube circular knit jacquard, single knit circular knit jacquard, double knit circular knit jacquard, warp knit tricot, warp knit raschel, and double needle bar raschel, for example. Moreover, any knitting process that may form a knitted structure from at least two yarns (e.g., yarns 113 and 114) may be utilized to manufacture knit component 110.

Whereas non-fusible yarn 113 is formed from a non-fusible material, fusible yarn 114 is formed from a fusible material. Examples of non-fusible materials include various thermoset polymer materials (e.g., polyester, acrylic) and natural fibers (e.g., cotton, silk, wool). When subjected to moderate levels of heat, thermoset polymer materials tend to remain stable. Moreover, when subjected to elevated levels of heat, thermoset polymer materials and natural fibers may burn or otherwise degrade. Examples of fusible materials include various thermoplastic polymer materials (e.g., polyurethane, polyester, nylon). In contrast with thermoset polymer materials and natural fibers, thermoplastic polymer materials melt when heated and return to a solid state when cooled. More particularly, thermoplastic polymer materials transition from a solid state to a softened or liquid state when subjected to sufficient heat, and then the thermoplastic polymer materials transition from the softened or liquid state to the solid state when sufficiently cooled. In some configurations, the non-fusible material used for non-fusible yarn 113 may also be a thermoplastic polymer material, particularly where the melting temperature of the thermoplastic polymer material used for non-fusible yarn 113 is greater than the melting temperature of the thermoplastic polymer material used for fusible yarn 114.

Thermoplastic polymer materials, as discussed above, melt when heated and return to a solid state when cooled. Based upon this property, the thermoplastic polymer material from fusible yarn 114 may be utilized to form a thermal bond that joins knit component 110 and bonded component 120. As utilized herein, the term "thermal bonding" or variants thereof is defined as a securing technique between two components that involves a softening or melting of a thermoplastic polymer material within at least one of the components such that the components are secured to each other when cooled. Similarly, the term "thermal bond" or variants thereof is defined as the bond, link, or structure that joins two components through a process that involves a softening or melting of a thermoplastic polymer material within at least one of the components such that the components are secured to each other when cooled.

As general examples, thermal bonding may involve (a) the melting or softening of thermoplastic polymer materials within two components such that the thermoplastic polymer materials intermingle with each other (e.g., diffuse across a boundary layer between the thermoplastic polymer materials) and are secured together when cooled; (b) the melting or softening of a thermoplastic polymer material within a first component such that the thermoplastic polymer material extends into or infiltrates the structure of a second component to secure the components together when cooled; and (c) the melting or softening of a thermoplastic polymer material within a first component such that the thermoplastic polymer material extends into or infiltrates crevices or cavities of a second component to secure the components together when cooled. As such, thermal bonding may occur when two components include thermoplastic polymer materials or when only one of the components includes a thermoplastic polymer material. Additionally, thermal bonding does not generally involve the use of stitching, adhesives, or other joining techniques, but involves directly bonding components to each other with a thermoplastic polymer material. In some situations, however, stitching, adhesives, or other joining techniques may be utilized to supplement the thermal bond or the joining of components through thermal bonding.

More specific examples of thermal bonding that relate to composite element 100 will now be discussed. In general, bonded component 120 may be any element that is joined with knit component 110, including textile elements (e.g., knit textiles, woven textiles, non-woven textiles), polymer sheets, polymer foam layers, leather or rubber elements, and plates, for example. In a configuration where bonded component 120 is formed from a textile element, thermal bonding may involve the melting or softening of a thermoplastic polymer material within fusible yarn 114 such that the thermoplastic polymer material extends into the textile element of bonded component 120 and around individual filaments, fibers, or yarns within the textile element to secure components 110 and 120 together when cooled. In a similar configuration where bonded component 120 is formed from a textile element incorporating a thermoplastic polymer material, thermal bonding may involve the melting or softening of thermoplastic polymer materials within each of fusible yarn 114 and the textile element of bonded component 120 such that the thermoplastic polymer materials intermingle with each other and are secured together when cooled. Moreover, in any configuration where bonded component 120 incorporates a thermoplastic polymer material (e.g., textiles, polymer sheets, polymer foam layers, leather or rubber elements, plates), thermal bonding may involve the melting or softening of thermoplastic polymer materials within each of fusible yarn 114 and bonded component 120 such that the thermoplastic polymer materials intermingle with each other and are secured together when cooled. Additionally, in a configuration where bonded component 120 is a polymer sheet, polymer foam layer, leather or rubber element, or plate, thermal bonding may involve the melting or softening of a thermoplastic polymer material within fusible yarn 114 such that the thermoplastic polymer material extends into crevices or cavities of bonded component 120 to secure components 110 and 120 together when cooled. Although many configurations of composite element 100 do not involve the use of stitching, adhesives, or other joining techniques, these joining techniques may be utilized to supplement the thermal bond or the joining of components 110 and 120 through thermal bonding.

Figure 3:
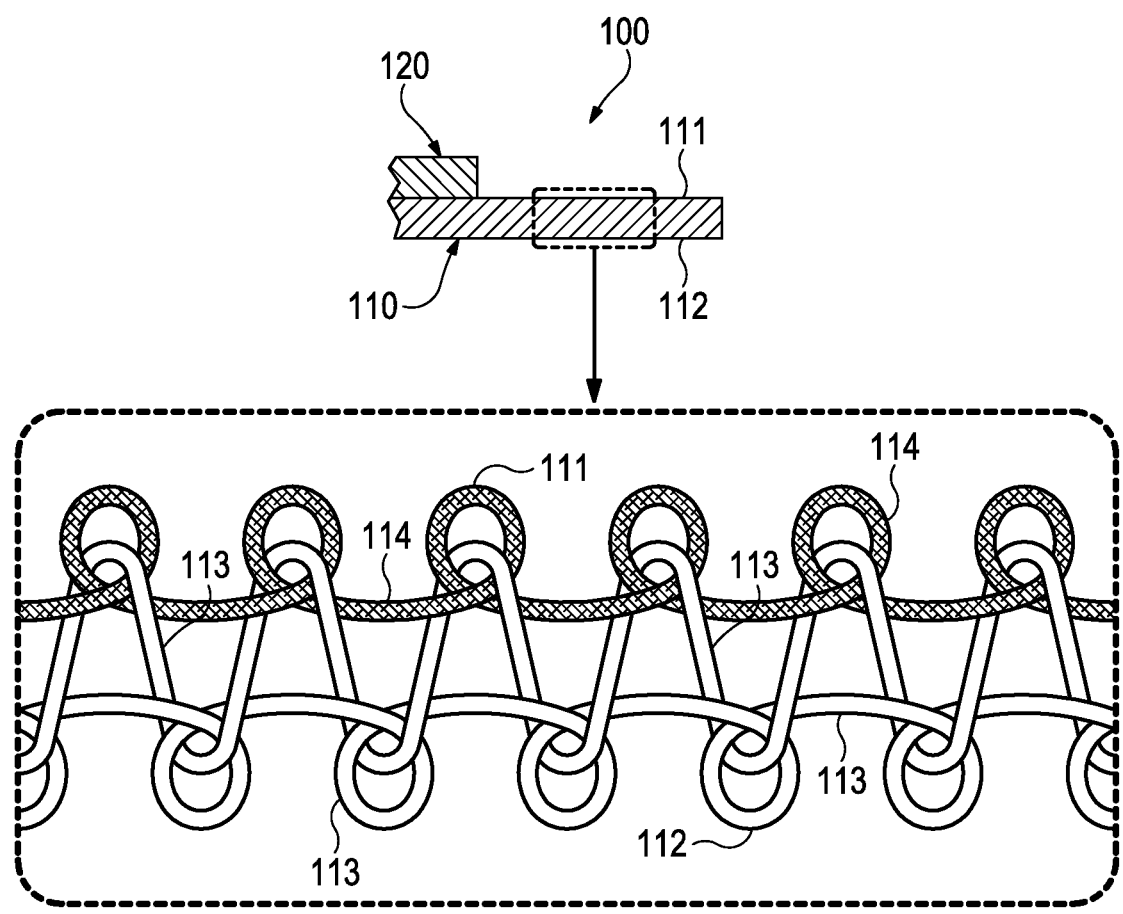
FIG. 3 is a schematic cross-sectional view of the composite element, as defined by section line 3-3 in FIG. 1.

Based upon the above discussion, knit component bonding generally includes utilizing a fusible material (e.g., a thermoplastic polymer material) within fusible yarn 114 of knit component 110 to form a thermal bond that joins or otherwise secures components 110 and 120 to each other. That is, bonded component 120 is joined through thermal bonding to knit component 110 with the fusible material from fusible yarn 114. In order to form the thermal bond, the fusible material is often located in a portion of knit component 110 that is adjacent to bonded component 120. Given that bonded component 120 is secured to first surface 111, therefore, the fusible material is often located at first surface 111 to thereby form a thermal bond with bonded component 120 at first surface 111. Referring to FIG. 3, non-fusible yarn 113 effectively extends throughout knit component 110 and from first surface 111 to second surface 112, whereas fusible yarn 114 is concentrated at first surface 111. In this configuration, the fusible material of fusible yarn 114 is positioned to contact bonded component 120 and form the thermal bond between components 110 and 120 at first surface 111. Any knit structure where a yarn (e.g., fusible yarn 114) is concentrated or present at one or both surfaces may be utilized to achieve this configuration.

Figure 4A:
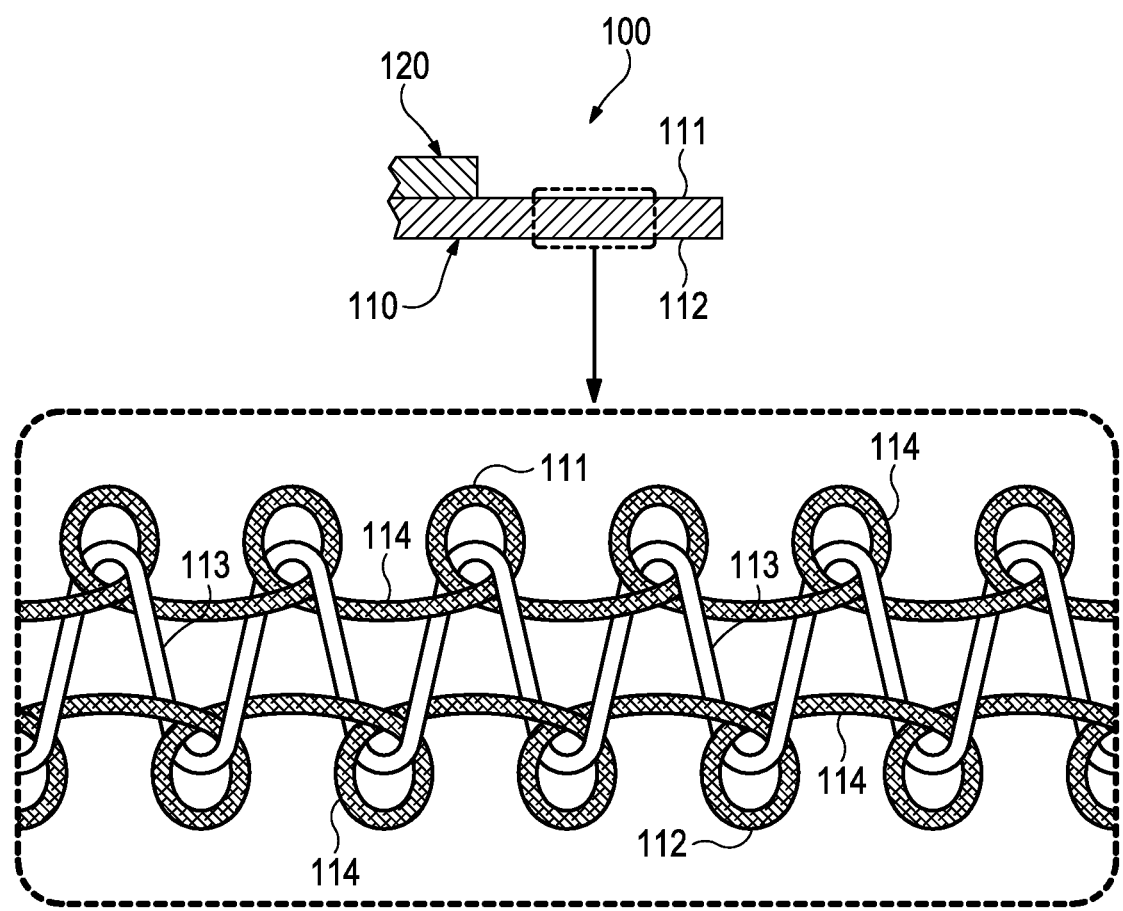
FIGS. 4A-4C are schematic cross-sectional views corresponding with FIG. 3 and depicting further configurations of the composite element.
Figure 4B:
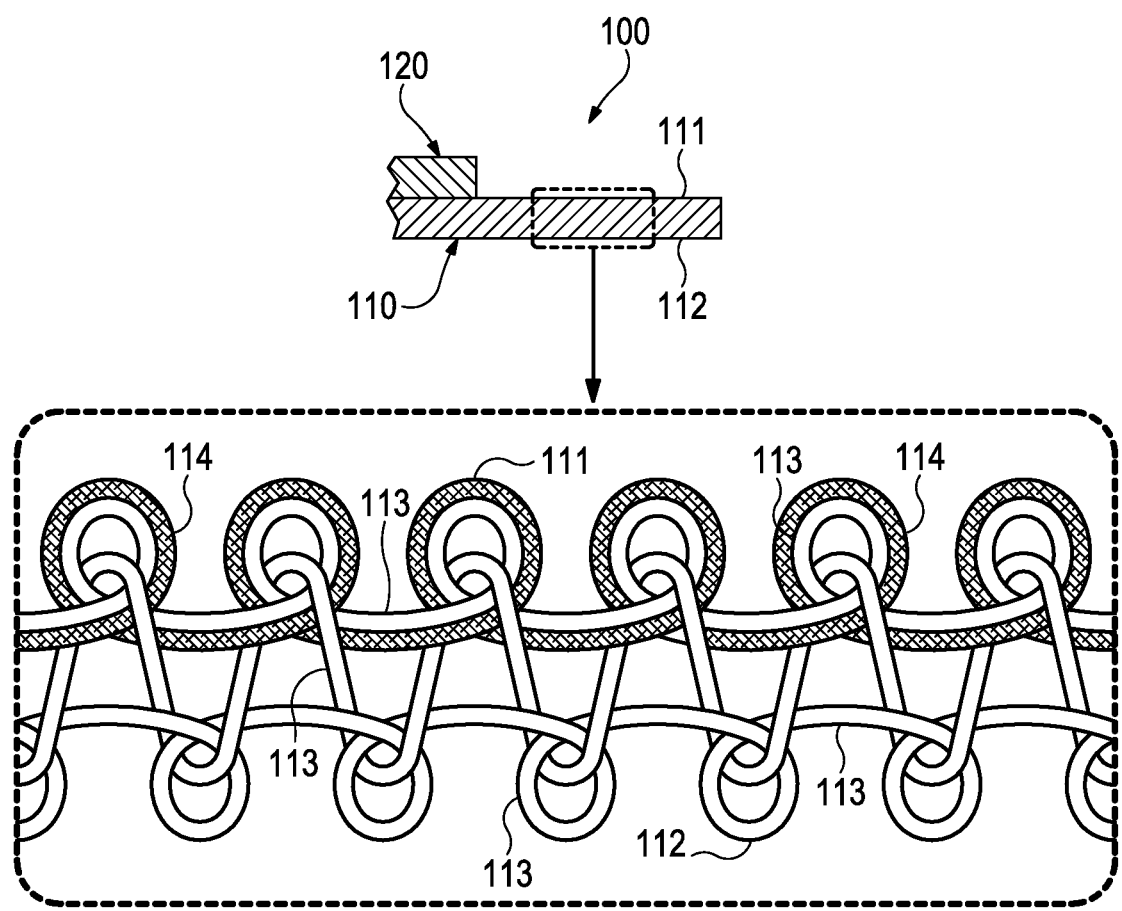
Figure 4C:
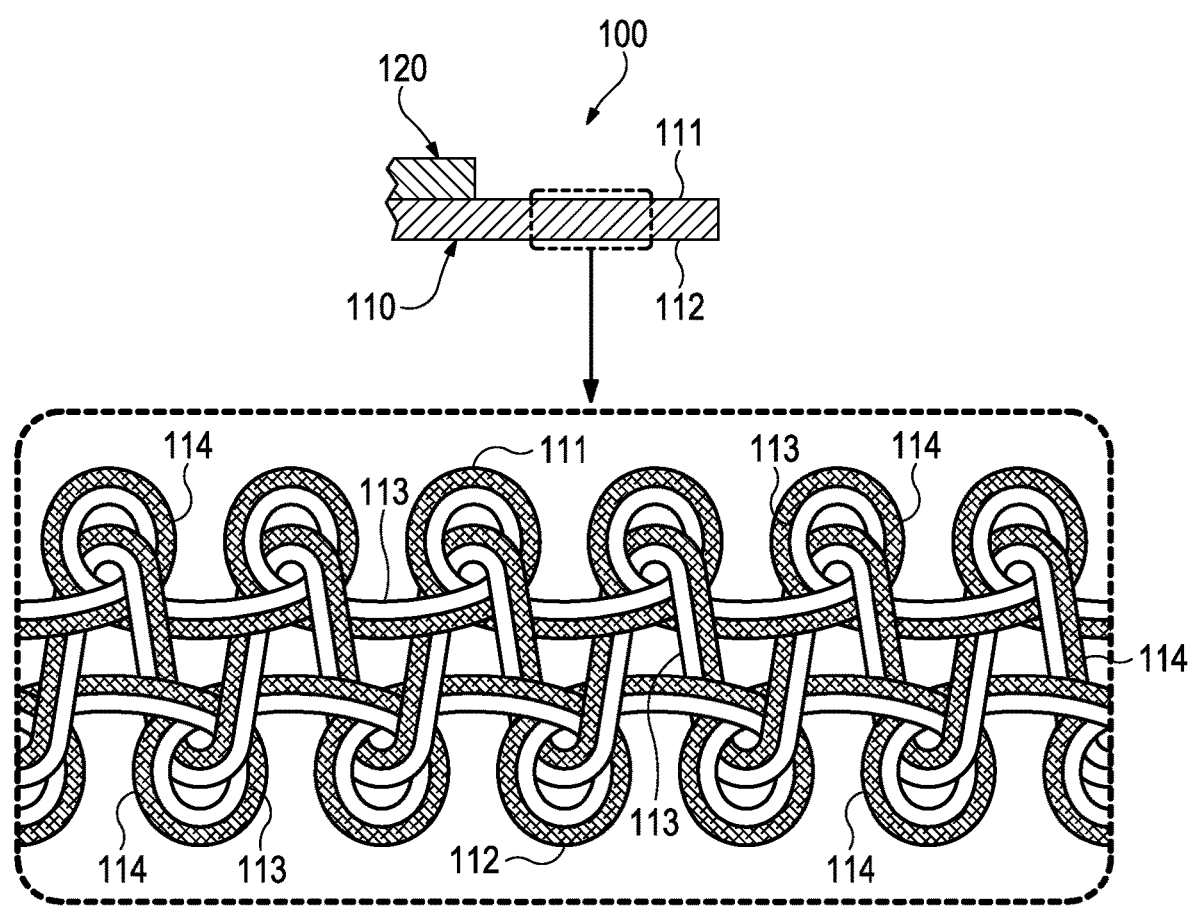

Although the configuration of FIG. 3 provides a suitable structure for forming a thermal bond between components 110 and 120, a variety of other knitted structures may also form a thermal bond. Referring to FIG. 4A, for example, non-fusible yarn 113 effectively extends throughout knit component 110 and from first surface 111 to second surface 112, whereas fusible yarn 114 is concentrated at both surfaces 111 and 112. As another example, FIG. 4B depicts a configuration wherein the portion of fusible yarn 114 located at first surface 111 is plated with a portion of non-fusible yarn 113. That is, yarns 113 and 114 run in parallel along first surface 111. Another configuration wherein yarns 113 and 114 are plated is depicted in FIG. 4C, where yarns 113 and 114 run in parallel throughout knit component 110. Accordingly, the configurations of yarns 113 and 114 within knit component 110 may vary considerably.

Referring again to FIG. 3, fusible yarn 114 is concentrated at first surface 111 and forms loops that extend around sections of non-fusible yarn 113. One consideration regarding this configuration relates to the potential for unraveling or releasing. When heated, the thermoplastic polymer material of fusible yarn 114 may soften or melt, which may effectively release the sections of non-fusible yarn 113. That is, the melting or softening of the thermoplastic polymer material of fusible yarn 114 may allow the knitted structure of knit component 110 to unravel, become non-cohesive, or otherwise release because fusible yarn 114 is no longer forming loops that hold the knitted structure together. In order to prevent this occurrence, the configurations of FIGS. 4B and 4C may be utilized. That is, yarns 113 and 114 may be plated so that they run in parallel. When fusible yarn 114 softens or melts, therefore, non-fusible yarn 113 remains intact and effectively holds the knitted structure together.

A further method of ensuring that the melting or softening of the thermoplastic polymer material in fusible yarn 114 does not release the knitted structure is to form portions of fusible yarn 114 from both fusible and non-fusible materials. Referring to FIG. 5A, for example, a portion of fusible yarn 114 is depicted as having various fusible filaments 115 and non-fusible filaments 116. Even when fusible filaments 115 melt or soften, non-fusible filaments 116 are present to prevent the knitted structure from releasing. In a similar configuration, FIG. 5B depicts filaments 115 and 116 as forming a sheath-core structure. That is, fusible filaments 115 are located peripherally to form a sheath and non-fusible filaments 116 are located centrally to form a core. Similarly, FIG. 5C depicts a configuration wherein fusible filaments 115 spiral around a core formed by non-fusible filaments 116.

Yet another method of ensuring that the melting or softening of the thermoplastic polymer material in fusible yarn 114 does not release the knitted structure is to form individual filaments within fusible yarn 114 from both fusible and non-fusible materials. Referring to FIG. 6A, for example, an individual filament 117 includes a fusible portion 118 and a non-fusible portion 119 in a sheath-core configuration. That is, fusible portion 118 is located peripherally to form a sheath and non-fusible portion 119 is located centrally to form a core. In another configuration, FIG. 6B depicts filament 117 as having one half formed from fusible portion 118 and another half formed from non-fusible portion 119. Fusible yarn 114 may, therefore, be formed from multiple filaments 117 that will only partially melt or soften when exposed to heat.

Figure 7A:
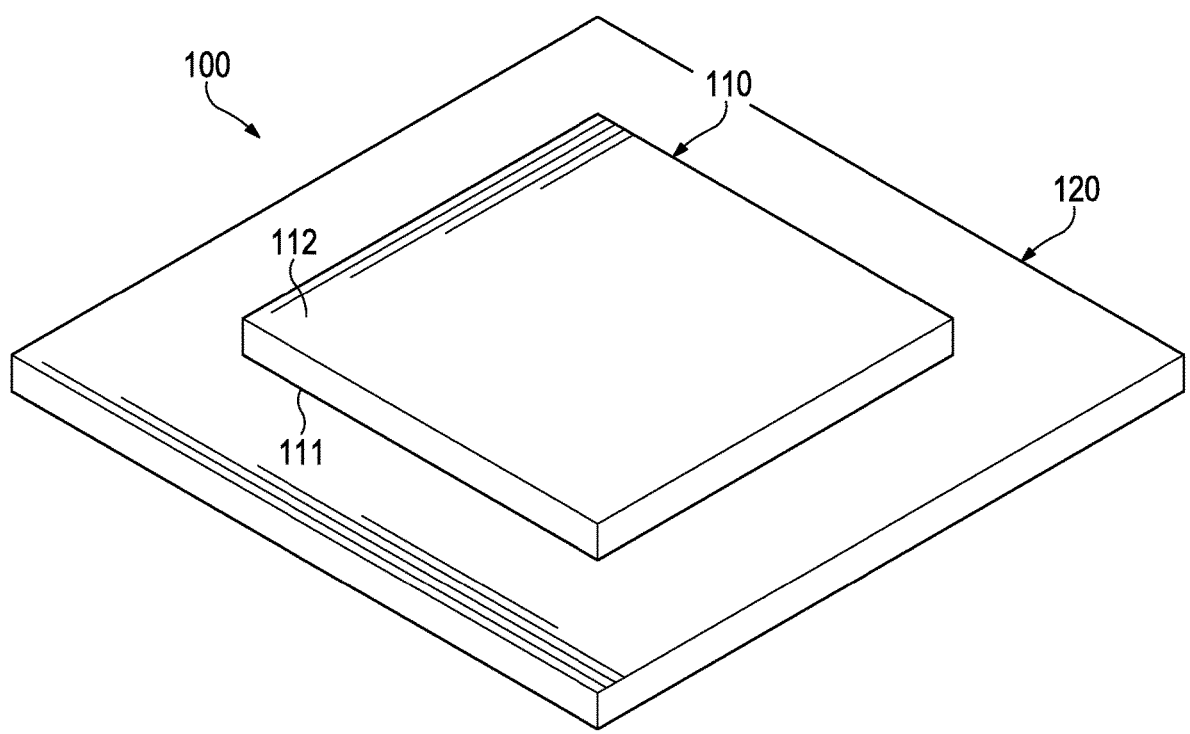
FIGS. 7A-7J are perspective views corresponding with FIG. 1 and depicting further configurations of the composite element.
Figure 7B:
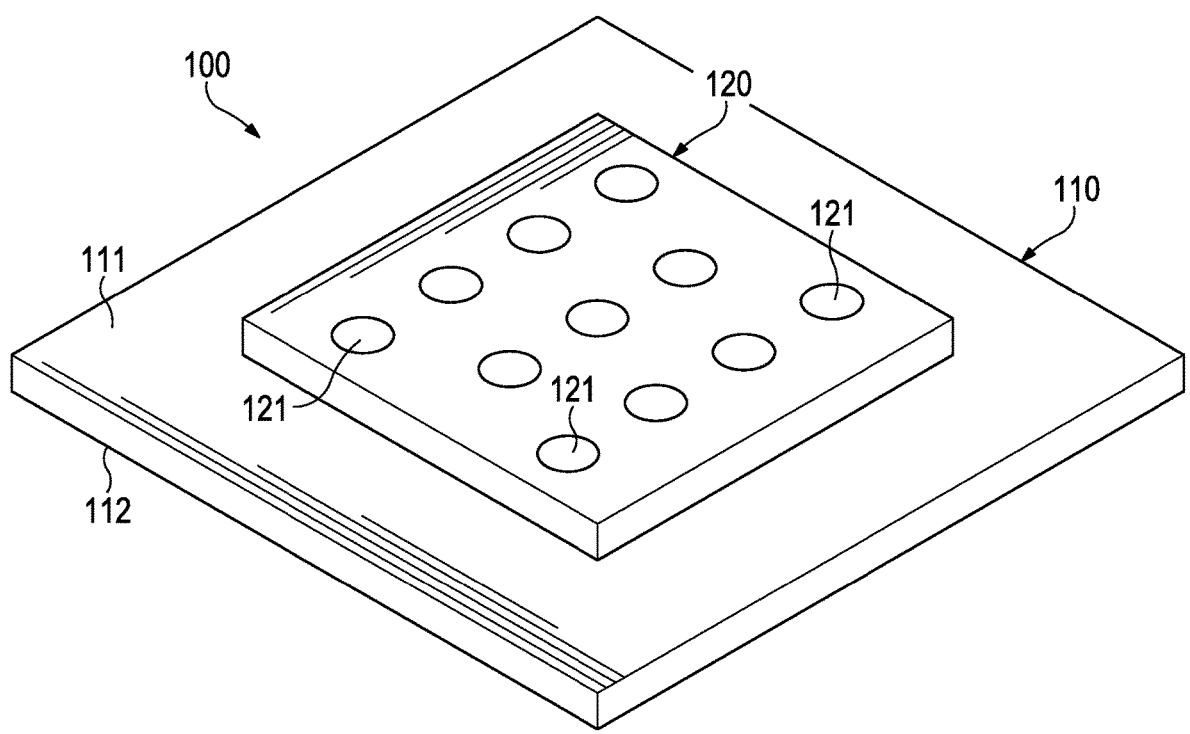
Figure 7C:
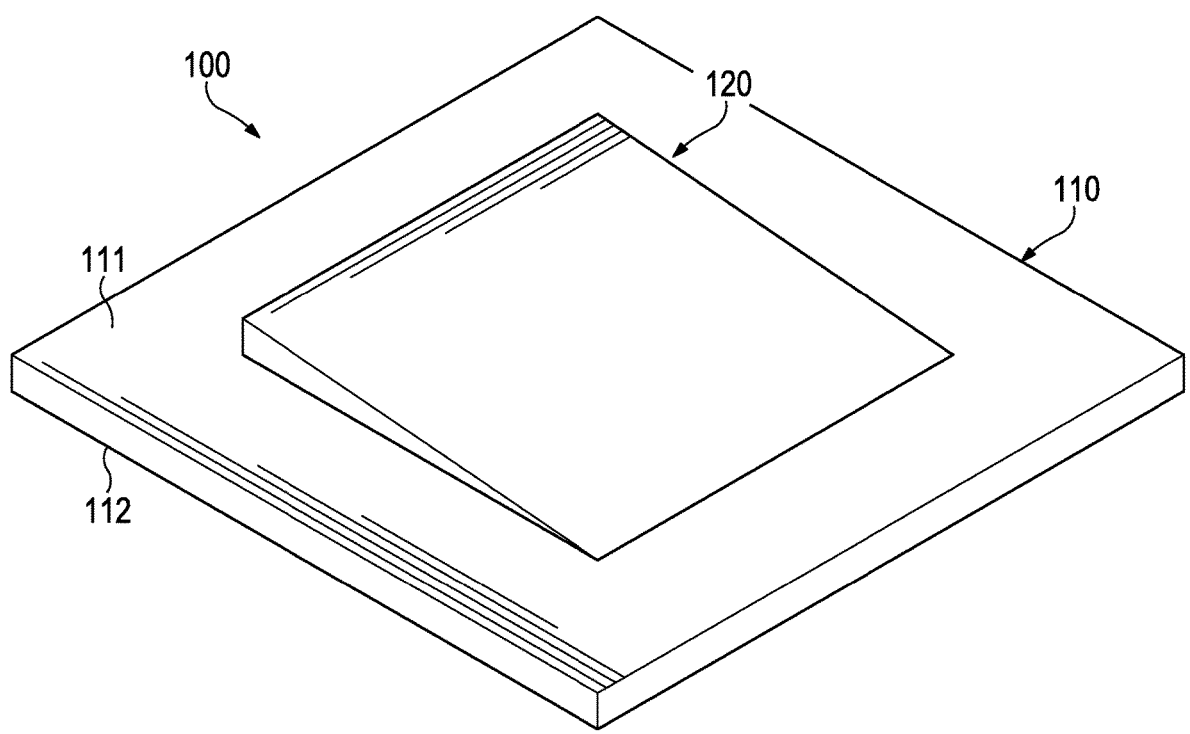
Figure 7D:
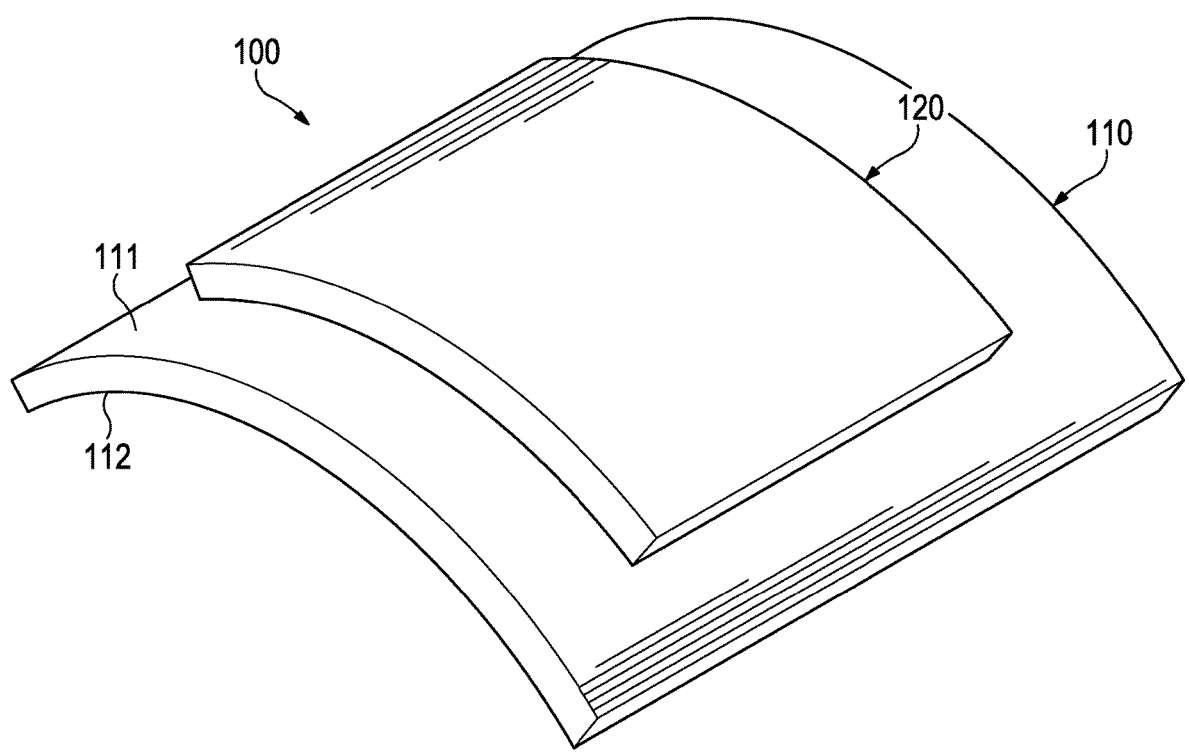
Figure 7E:
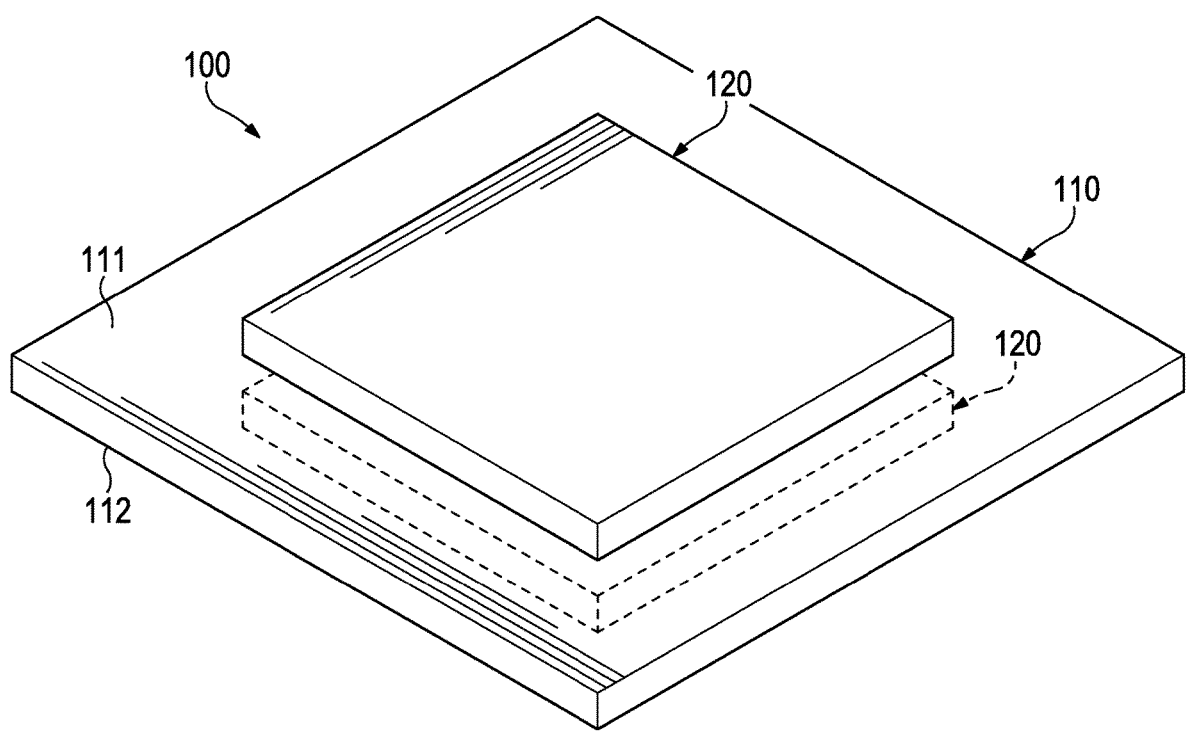

The configuration of composite element 100 in FIGS. 1-3 provides an example of the manner in which knit component bonding may be utilized to join components 110 and 120. Given that knit component bonding may be utilized in various products, numerous aspects relating to composite element 100 may vary from the configuration depicted in FIGS. 1-3. Moreover, variations in either of components 110 and 120 may alter the properties of composite element 100, thereby enhancing the products in which knit component bonding is utilized. Referring to FIG. 7A, for example, bonded component 120 is depicted as having a greater size than knit component 110. FIG. 7B depicts a configuration wherein bonded component 120 forms a plurality of apertures 121. When bonded component 120 is a polymer sheet, polymer foam element, or plate, for example, apertures 121 may be utilized to enhance the fluid permeability or flexibility of composite element 100. Although both components 110 and 120 may have constant thickness, one or both of components 110 and 120 may also have a varying thickness. Referring to FIG. 7C, for example, bonded component 120 has a tapered configuration. Although both components 110 and 120 may be planar, one or both of components 110 and 120 may also have a contoured configuration. Referring to FIG. 7D, for example, components 110 and 120 are curved. In the configurations of FIGS. 5A and 5C, fusible yarn 114 is concentrated at both surfaces 111 and 112. This may provide the advantage of allowing bonded components 120 to be thermal bonded to either of surfaces 111 and 112. For example, FIG. 7E depicts a configuration wherein one bonded component 120 is thermal bonded to first surface 111 and another bonded component 120 is thermal bonded to second surface 112.

Figure 7F:
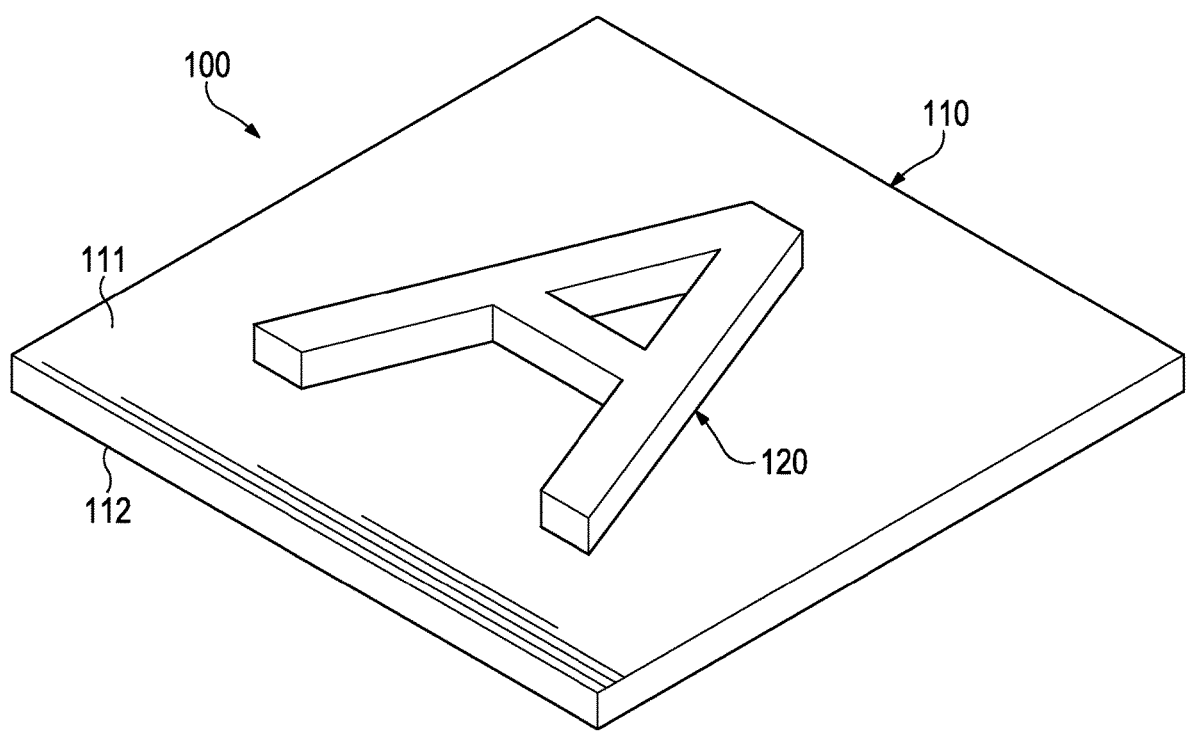
Figure 7G:
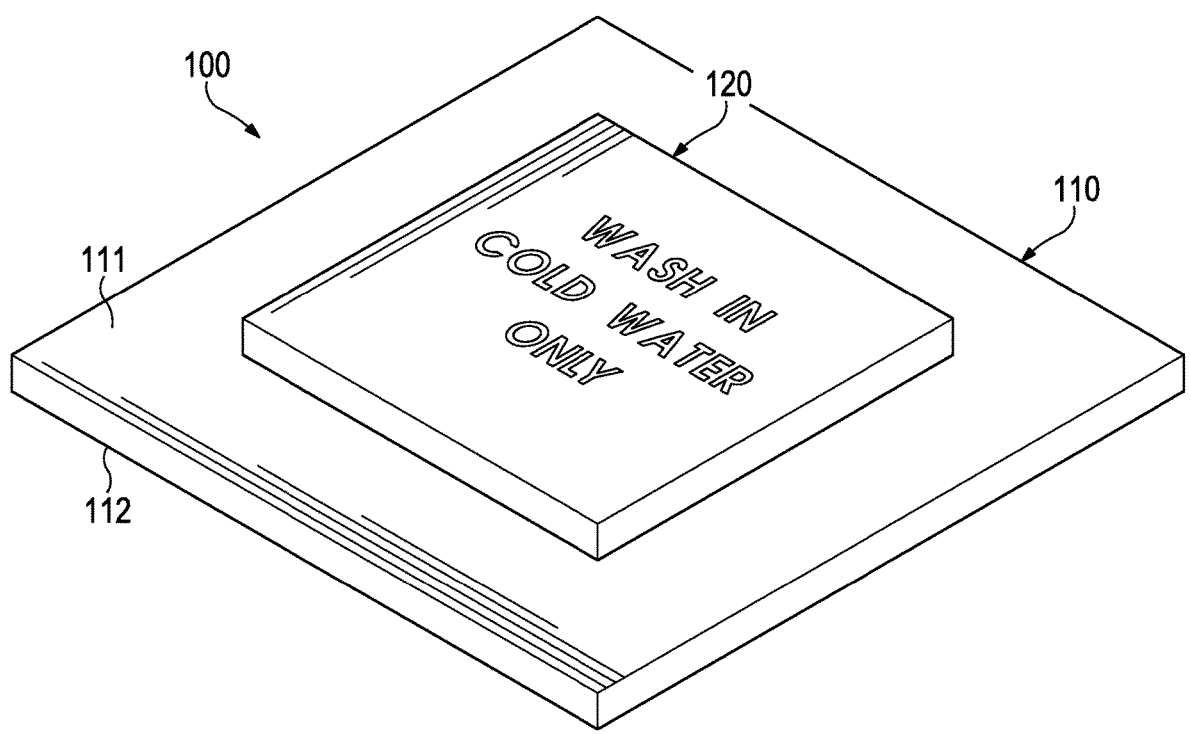

In addition to the various structural aspects of different configurations of composite element 100 depicted in FIGS. 7A-7E, some configurations of composite element 100 may provide aesthetic, informational, or other nonstructural benefits. Referring to FIG. 7F, for example, bonded component 120 is a letter "A" that is secured to knit component 110 through knit component bonding. The letter "A" or other indicia may be utilized to impart information about a product, such as trademarks of the manufacturer. Similarly, FIG. 7G depicts bonded component 120 as being a placard having care instructions, as for an article of apparel.

Figure 7H:
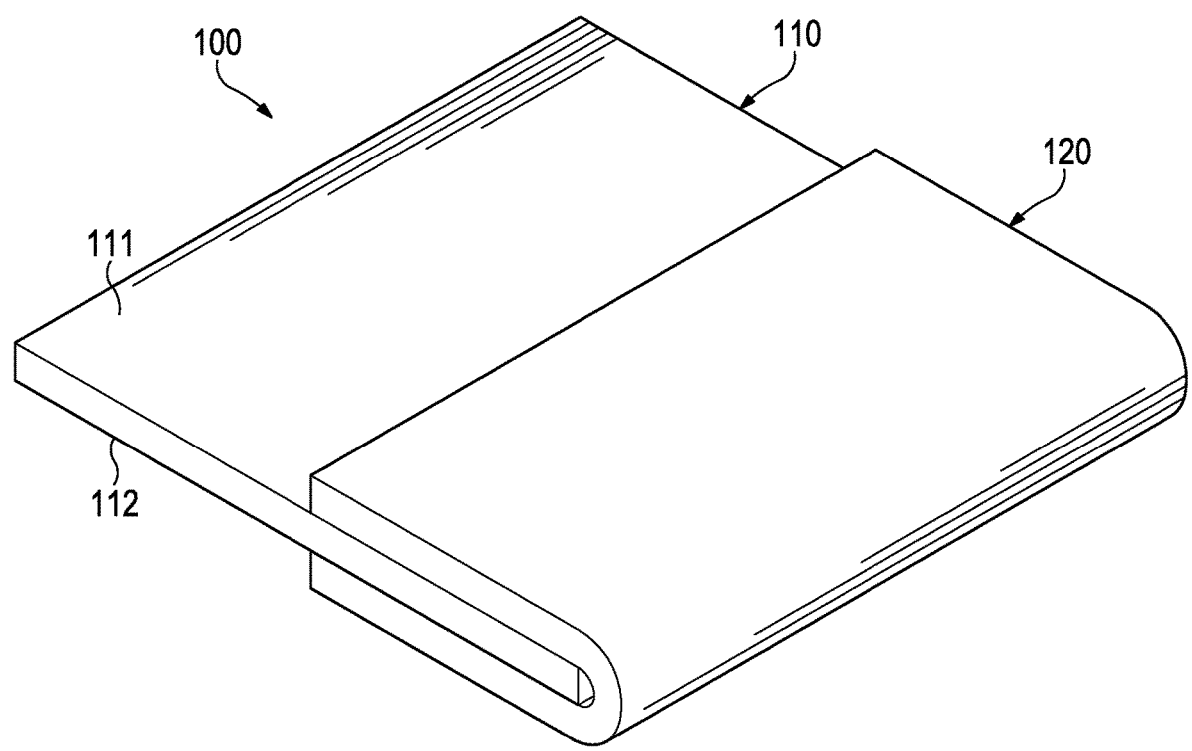
Figure 7I:
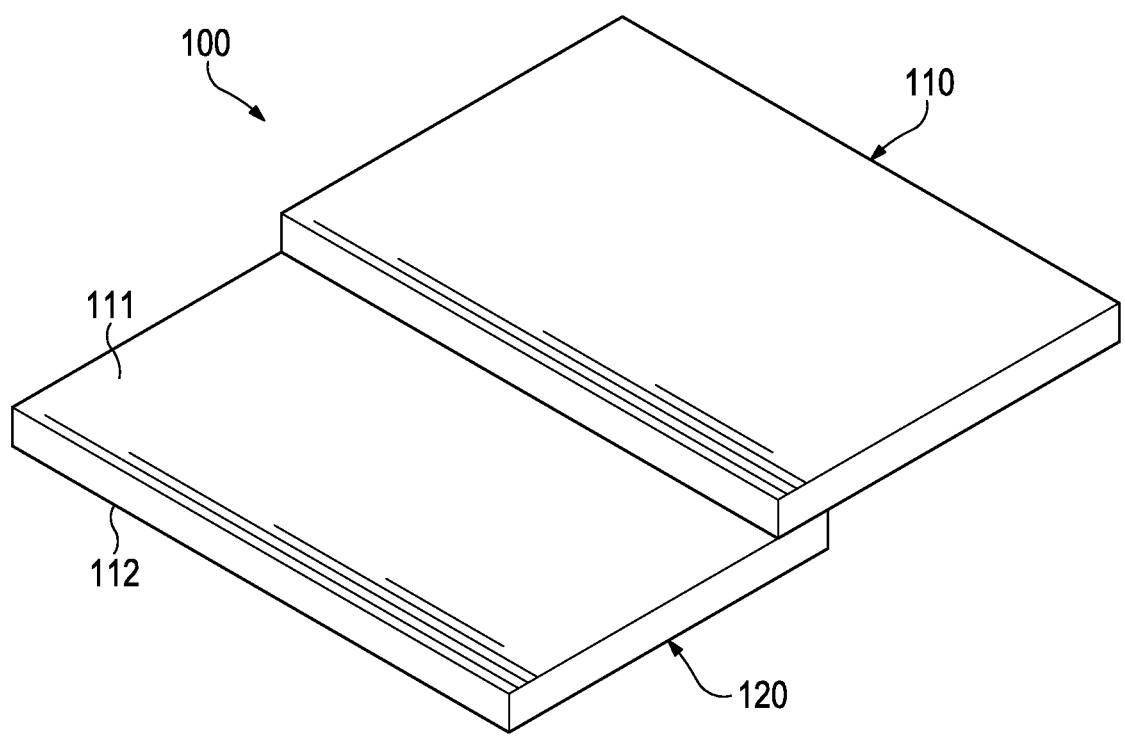
Figure 7J:
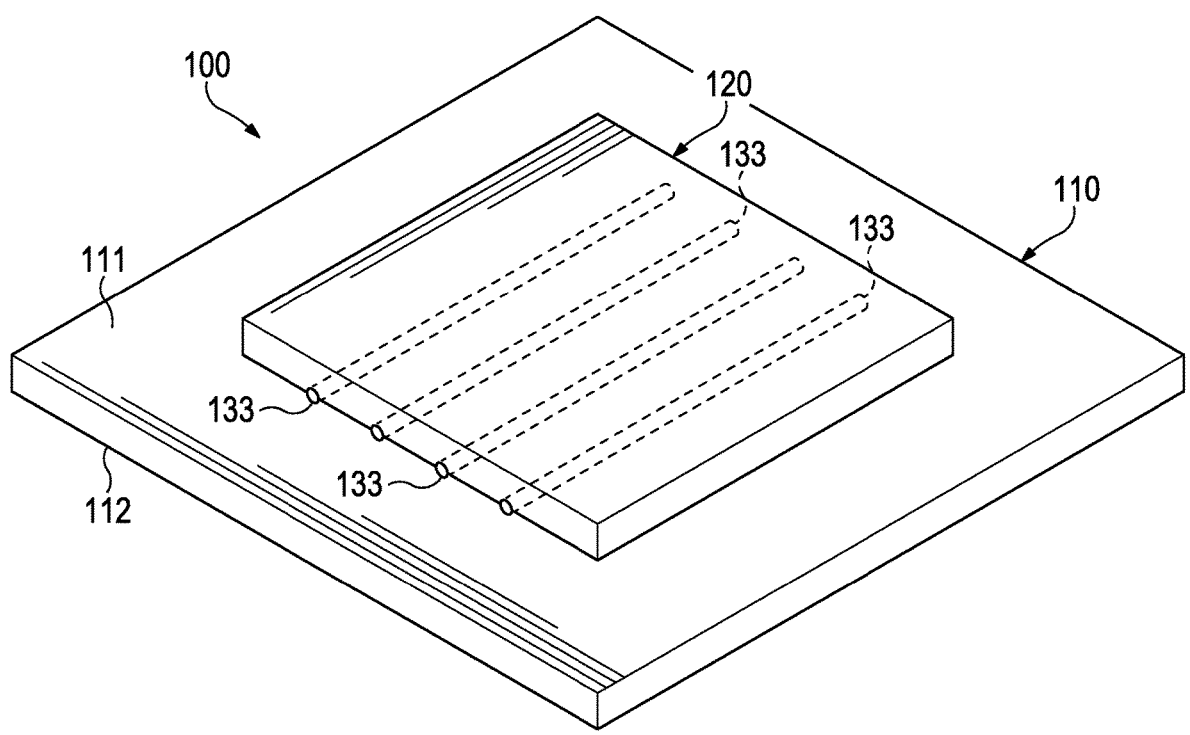

Referring to FIGS. 5A and 5C, fusible yarn 114 is located on both surfaces 111 and 112. In these configurations, bonded component 120 may be secured to either of surfaces 111 and 112. Referring to FIG. 7H, bonded component 120 may also wrap around knit component 110, thereby being bonded to both of surfaces 111 and 112. In another configuration, components 110 and 120 may be thermal bonded at their edges, as depicted in FIG. 7I, in order to replace stitching and form a seam between components 110 and 120. Referring to FIG. 7J, various strands 133 may be located between and thermal bonded between components 110 and 120. Strands 133 may, for example, resist stretch in directions corresponding with their lengths. As such, the combination of components 110 and 120 and strands 133 may be utilized in footwear, for example, as disclosed in U.S. Pat. No. 7,770,307 to Meschter, which is incorporated herein by reference.

An advantage of composite element 100 is that properties from both components 110 and 120 combine to enhance the overall properties of composite element 100. In configurations where bonded component 120 is a textile, bonded component 120 may have different textile properties than knit component 110. The resulting composite element 100 may, therefore, exhibit the textile properties of both components 110 and 120. When bonded component 120 is a polymer sheet, bonded component 120 may impart resistance to fluid permeability or wear resistance. If, for example, bonded component 120 is formed from a compressible material, such as a polymer foam element, then composite element 100 may be suitable for articles of apparel where cushioning (i.e., attenuation of impact forces) is advantageous, such as padding for athletic activities that may involve contact or impact with other athletes or equipment. Similar protective attributes may be present when bonded component is a plate.

The combination of properties from components 110 and 120 may also be present when methods other than knit component bonding (e.g., adhesives, stitching) are utilized to join components 110 and 120. An advantage to knit component bonding however, is that no adhesives or other elements are present between components 110 and 120. For example, some adhesives (e.g., hot melt) may impair fluid permeability through composite element 100. Also, adhesives may be visible around edges of bonded component 120, thereby decreasing the aesthetic appeal of a product. Moreover, forming stitching may be a time-consuming process, the stitches may compress either of components 110 and 120, and the stitches may be visible from the exterior of composite element 100. Accordingly, knit component bonding 100 may be utilized to alleviate the disadvantages discussed above, for example, in other joining methods.

Fusible yarn 114 may extend throughout knit component 110. In addition to imparting the advantage of knit component bonding, fusible yarn 114 may have the effect of stiffening or rigidifying the structure of knit component 110. More particularly, fusible yarn 114 may also be utilized to join one portion of non-fusible yarn 113 to another portion of non-fusible yarn 113, which has the effect of securing or locking the relative positions of non-fusible yarn 113, thereby imparting stretch-resistance and stiffness. That is, portions of non-fusible yarn 113 may not slide relative to each other when fused by fusible yarn 114, thereby preventing warping or permanent stretching of knit component 110 due to relative movement of the knitted structure. Another benefit relates to limiting unraveling if a portion of knit component 110 becomes damaged or a portion of non-fusible yarn 113 is severed.

Figure 8A:
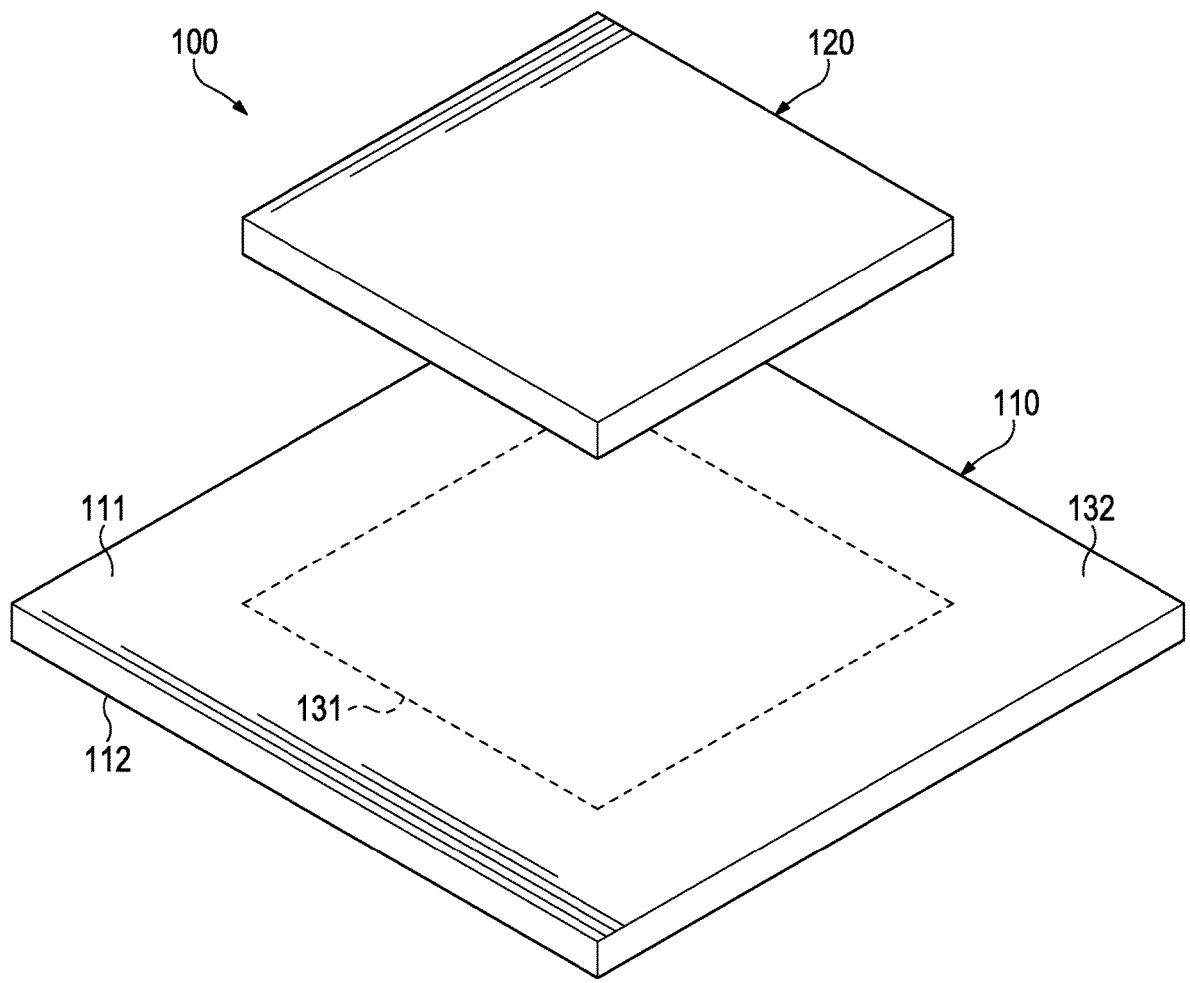
FIG. 8A-8C are exploded perspective views corresponding with FIG. 2 and depicting further configurations of the composite element.
Figure 8B:
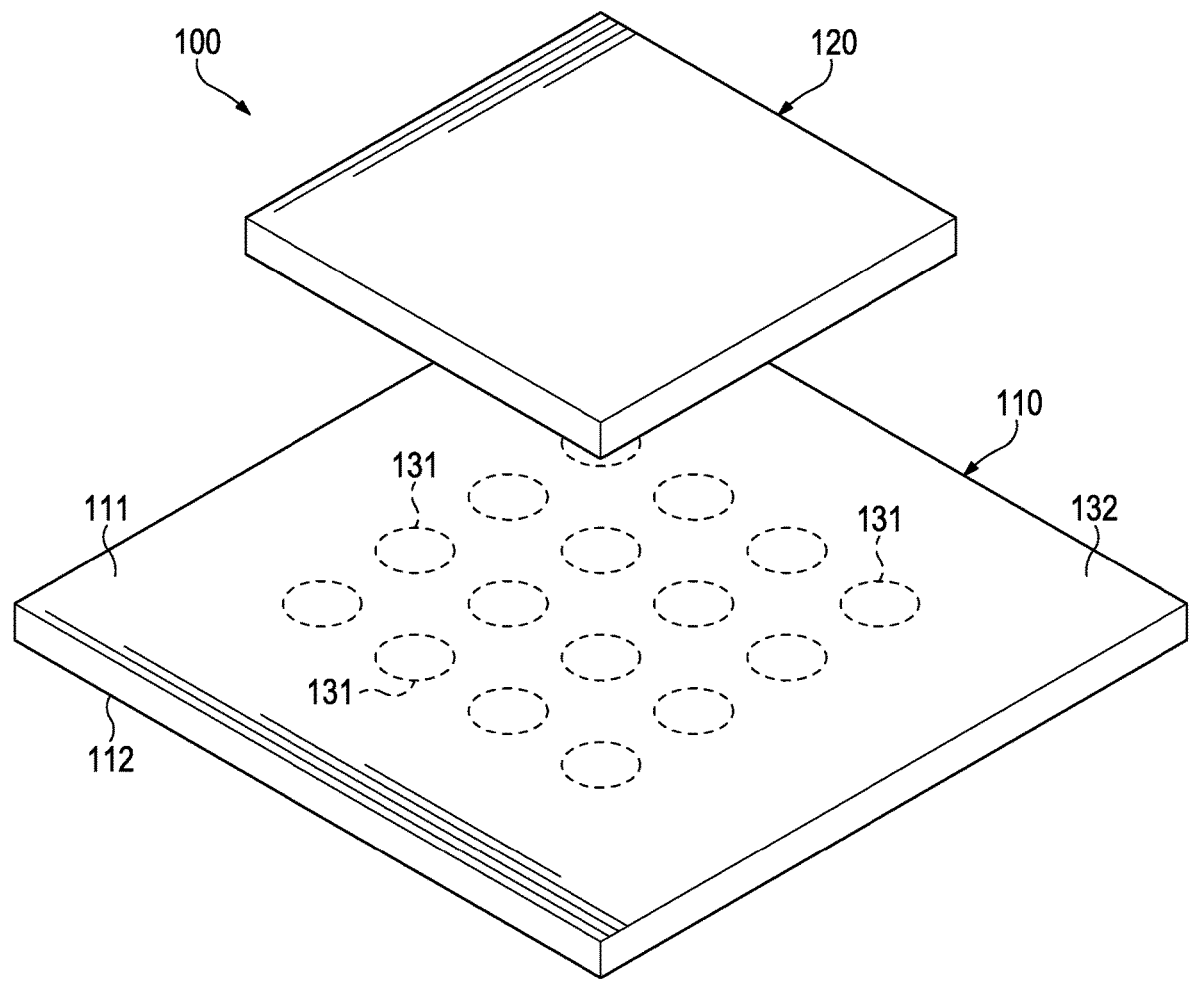

Although fusible yarn 114 may extend throughout knit component 110, fusible yarn 114 may be limited to specific areas of knit component 110. Referring to FIG. 8A, for example, an exploded perspective view of composite element 100 depicts knit component 110 as having a bonding area 131 and a peripheral area 132. Bonding area 131 corresponds with the portion of first surface 111 where bonded element 120 is thermal bonded to knit component 110. Moreover, fusible yarn 114 may be limited to bonding area 131. That is, fusible yarn 114 may be absent from peripheral area 132. In some configurations, an advantage may be gained by not joining one portion of non-fusible yarn 113 to another portion of non-fusible yarn 113 in peripheral area 132. Accordingly, by placing fusible yarn 114 in specific areas of knit component 110, knit component bonding may be performed in those areas, while reducing the effects of fusible yarn 114 in other areas. A similar configuration is depicted in FIG. 8B, wherein various bonding areas 131 are formed in the portion of first surface 111 where bonded element 120 is joined to knit component 110. In some configurations, bonding areas 131 may be individual stitches where fusible yarn 114 is present and exposed on first surface 111.

Figure 8C:
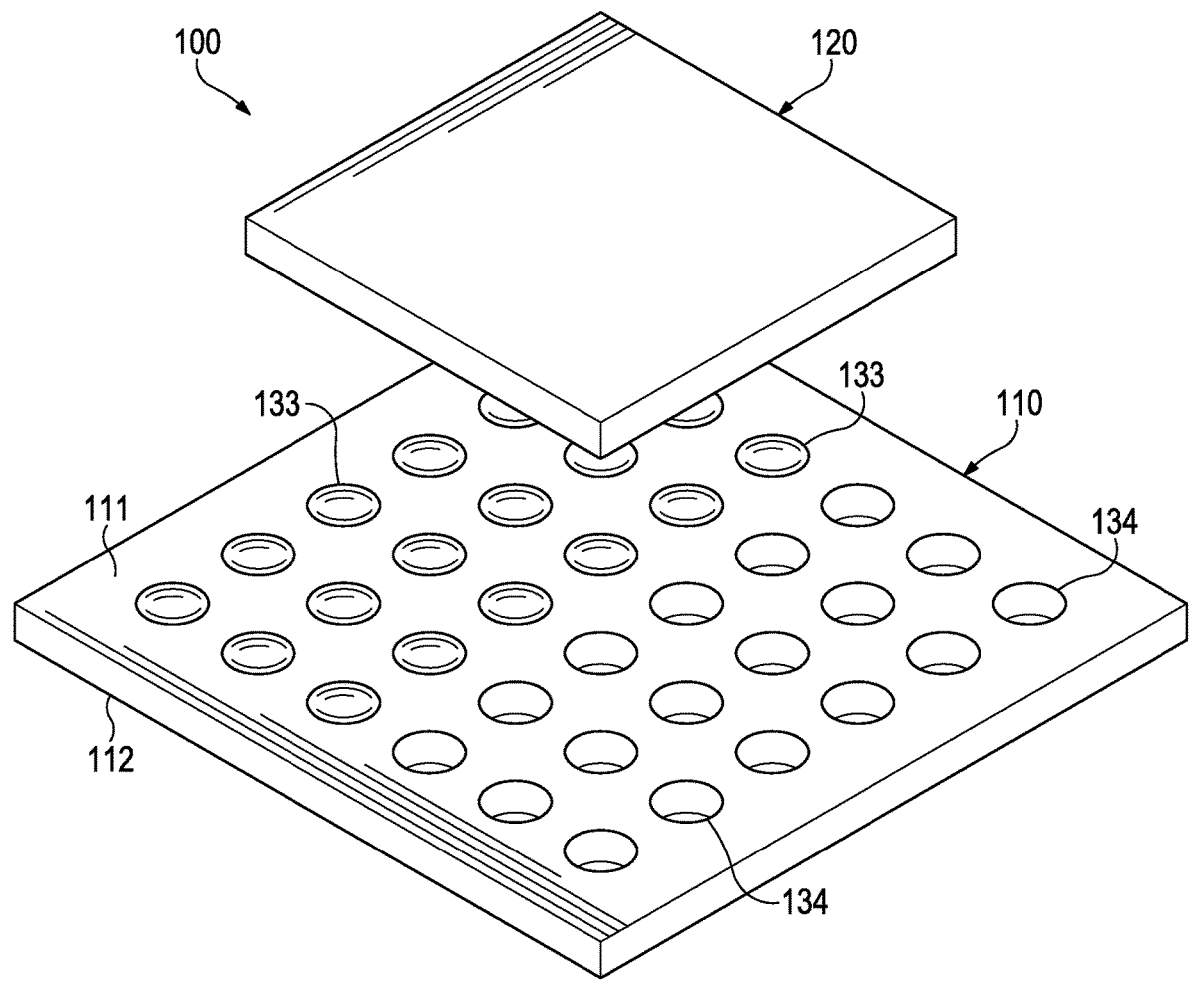

Knit component 110 may have a generally planar and continuous configuration. In some configurations, as depicted in FIG. 8C, the knitted structure of knit component 110 may define various indentations 133 or apertures 134. That is, the knitted structure may be knit to form surface features or other elements by varying the knitted structure in specific locations. Alternately, indentations 133 or other surface features may be formed through embossing, for example. In addition to enhancing the aesthetic appeal of composite element 100, indentations 133 and apertures 134 may increase properties such as fluid permeability and flexibility, while decreasing the overall mass of composite element 100.

Based upon the above discussion, composite element 100 has a configuration wherein components 110 and 120 are secured together through knit component bonding. In general, knit component bonding includes utilizing a fusible material (e.g., a thermoplastic polymer material in fusible yarn 114) within knit component 110 to form a thermal bond that joins or otherwise secures components 110 and 120 to each other. The various configurations of composite element 100 discussed above provide examples of general configurations in which knit component bonding may be implemented. As such, the various configurations of composite element 100 may be utilized in a variety of products to impart a range of benefits to those products.

Bonding Process

The general process by which knit component bonding is performed will now be discussed in detail. As a preliminary aspect of the process, knit component 110 is formed through a knitting process. Generally, a knitting machine may be programmed to knit a textile (i.e., knit component 110) with non-fusible yarn 113 and fusible yarn 114. Moreover, the knitting machine may also locate fusible yarn 113 on at least one surface, such as first surface 111. In effect, therefore, the knitting process may include concentrating fusible yarn 114 at first surface 111. In some configurations, the knitting process may also extend fusible yarn 114 from first surface 111 to second surface 112 or plate yarns 113 and 114. Hand knitting, rather than machine knitting, may also be utilized.

Figure 9A:
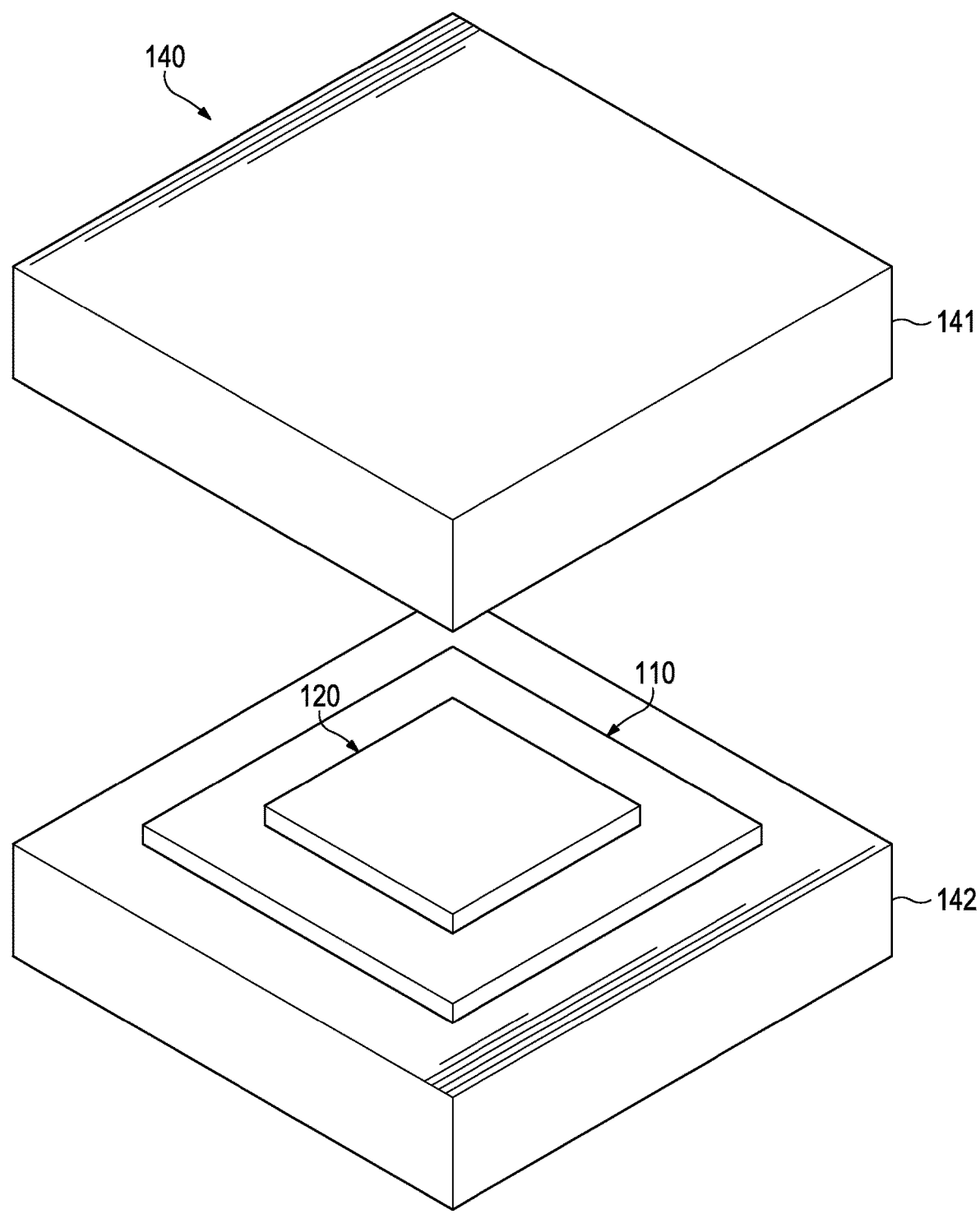
FIGS. 9A-9C are schematic perspective views of a process for performing knit component bonding.
Figure 9B:
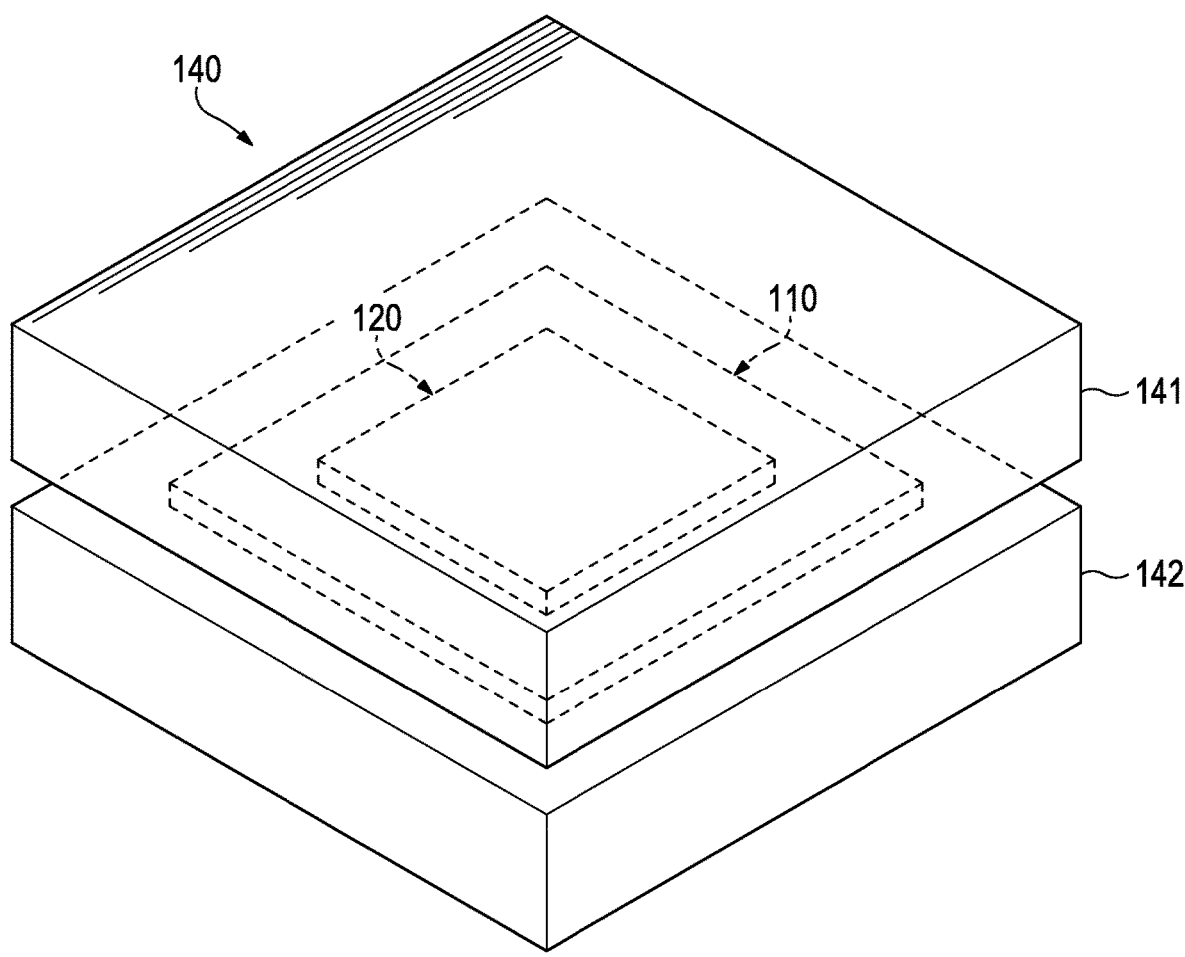
Figure 9C:
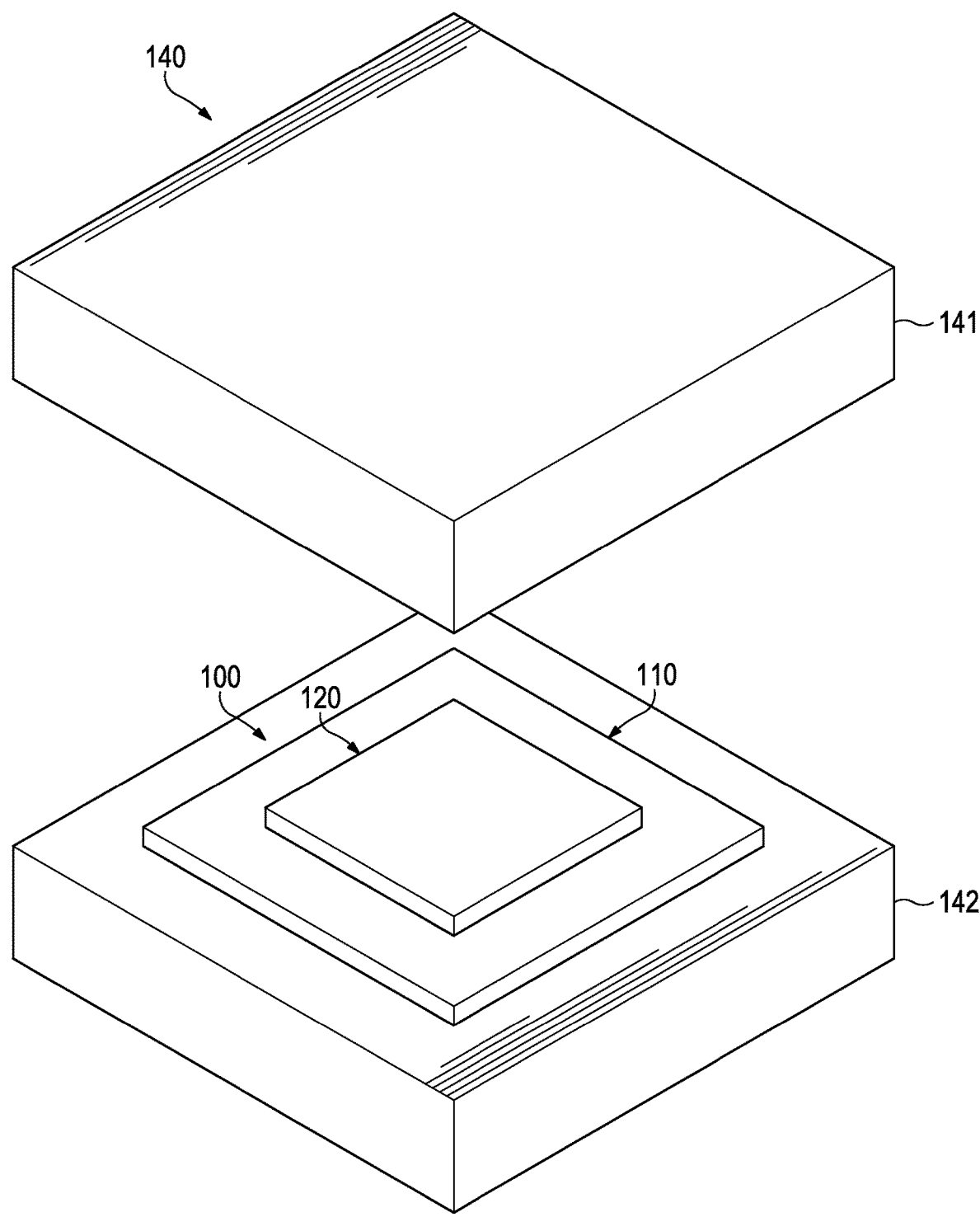

Once knit component 110 is formed, both of components 110 and 120 may be placed within a heat press 140, as depicted in FIG. 9A. More particularly, bonded component 120 may be placed adjacent to a portion of first surface 111 where bonding is intended to occur, and both of components 110 and 120 may be located between opposing portions 141 and 142 of heat press 140. Once positioned, portions 141 and 142 may translate toward each other to compress and apply heat to components 110 and 120, as depicted in FIG. 9B. That is, components 110 and 120 may be compressed and heated to a temperature that causes the thermoplastic polymer material in fusible yarn 114 to melt or soften. Due to the compression from portions 141 and 142, portions of the melted or softened thermoplastic polymer material may contact or otherwise engage bonded component 120. Following sufficient heating and compression, portions 141 and 142 separate, as depicted in FIG. 9C, and components 110 and 120 may be removed. Following cooling, the thermoplastic polymer material from fusible yarn 114 securely forms a thermal bond that joins components 110 and 120 to each other.

Heat press 140 provides an advantage of simultaneously heating and compressing components 110 and 120. In other bonding processes, components 110 and 120 may be heated prior to being compressed within heat press 140 or a cold press. Examples of heating methods that may be utilized include conduction, infrared, ultrasonic, high frequency, radio frequency, vibration heating, and steam heating.

Product Configurations

Following the process of knit component bonding discussed above, composite element 100 may be incorporated into one of various products, including many of the products discussed in the Background above. As specific examples of products that may incorporate concepts associated with knit component bonding, two articles of apparel, a shirt 200 and an article of footwear 300, will now be discussed.

Figure 10:
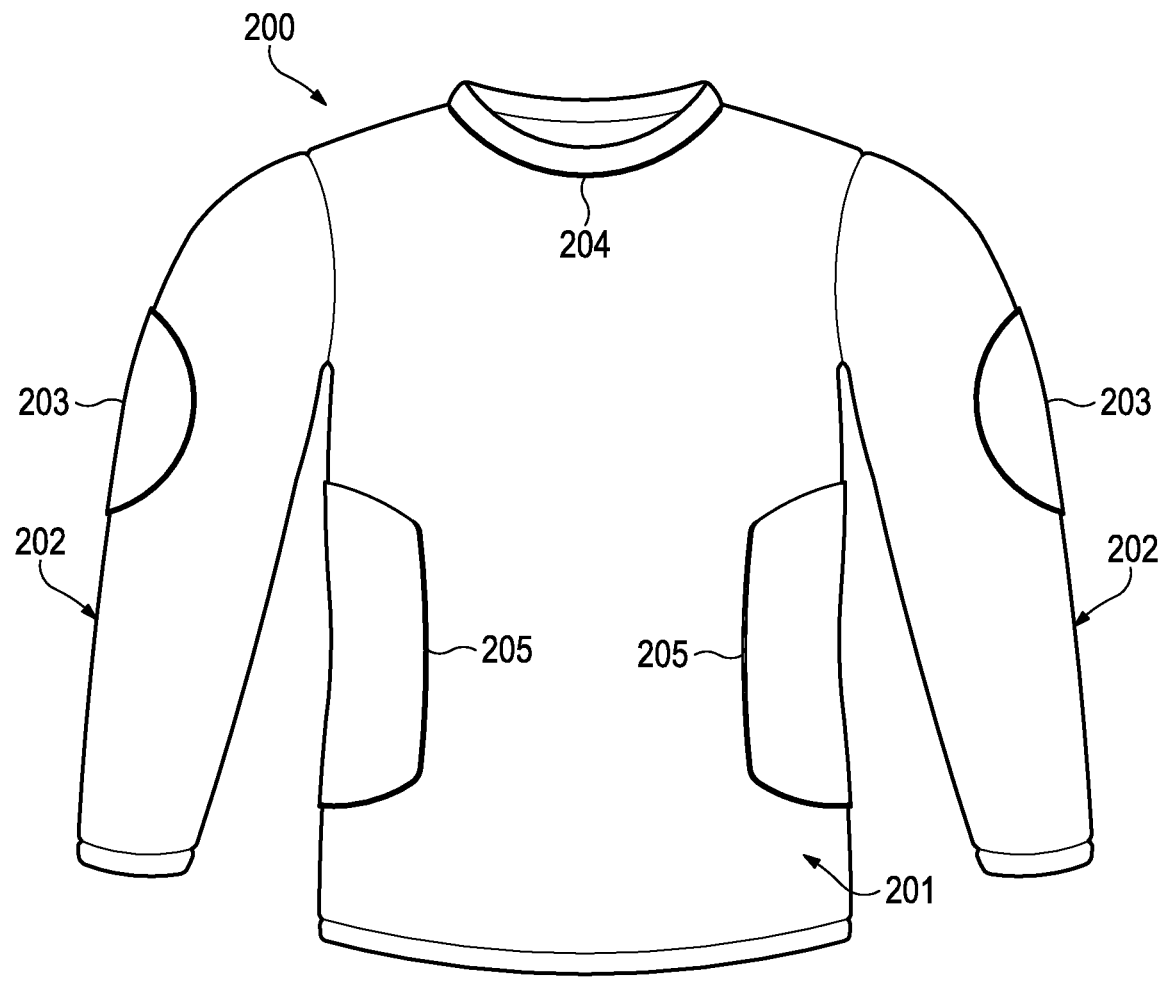
FIG. 10 is an elevational view of an article of apparel having a configuration of a shirt.

Shirt 200 is depicted in FIG. 10 as including a torso region 201 and a pair of arm regions 202 that extend outward from torso region 201. Torso region 201 corresponds with a torso of a wearer and covers at least a portion of the torso when worn. Similarly, arm regions 202 correspond with arms of the wearer and cover at least a portion of the arms when worn. Torso region 201 and arm regions 202 may both be formed from a textile that is similar to knit component 110. That is, the textile forming torso region 201 and arm regions 202 may be at least partially formed from a yarn incorporating a fusible material, which has properties similar to fusible yarn 114. Moreover, the fusible material may be oriented to form at least a portion of the exterior surface of shirt 200. The textile forming torso region 201 and arm regions 202 may also be at least partially formed from a yarn incorporating a non-fusible material, which has properties similar to non-fusible yarn 113.

Given the configuration of shirt 200 discussed above, various components 203205 may be secured to shirt 200 through knit component bonding. Referring specifically to FIG. 10, two components 203 are secured to elbow areas of arm regions 202 and may be polymer or leather sheets that provide wear resistance to the elbow areas. Component 204 is also located around a neck opening of torso region 201 and may be a polymer sheet that enhances the stretch-resistance of the area around the neck opening. Additionally, two components 205 are bonded to side areas of torso region 201 and may be polymer foam elements that attenuate forces impacting the sides of the wearer during athletic activities. Accordingly, the general concepts of knit component bonding may be utilized in shirt 200 to impart a variety of benefits. Moreover, similar concepts may be applied to a variety of other types of apparel to impart similar benefits, including headwear, pants, undergarments, socks, and gloves.

Figure 11:
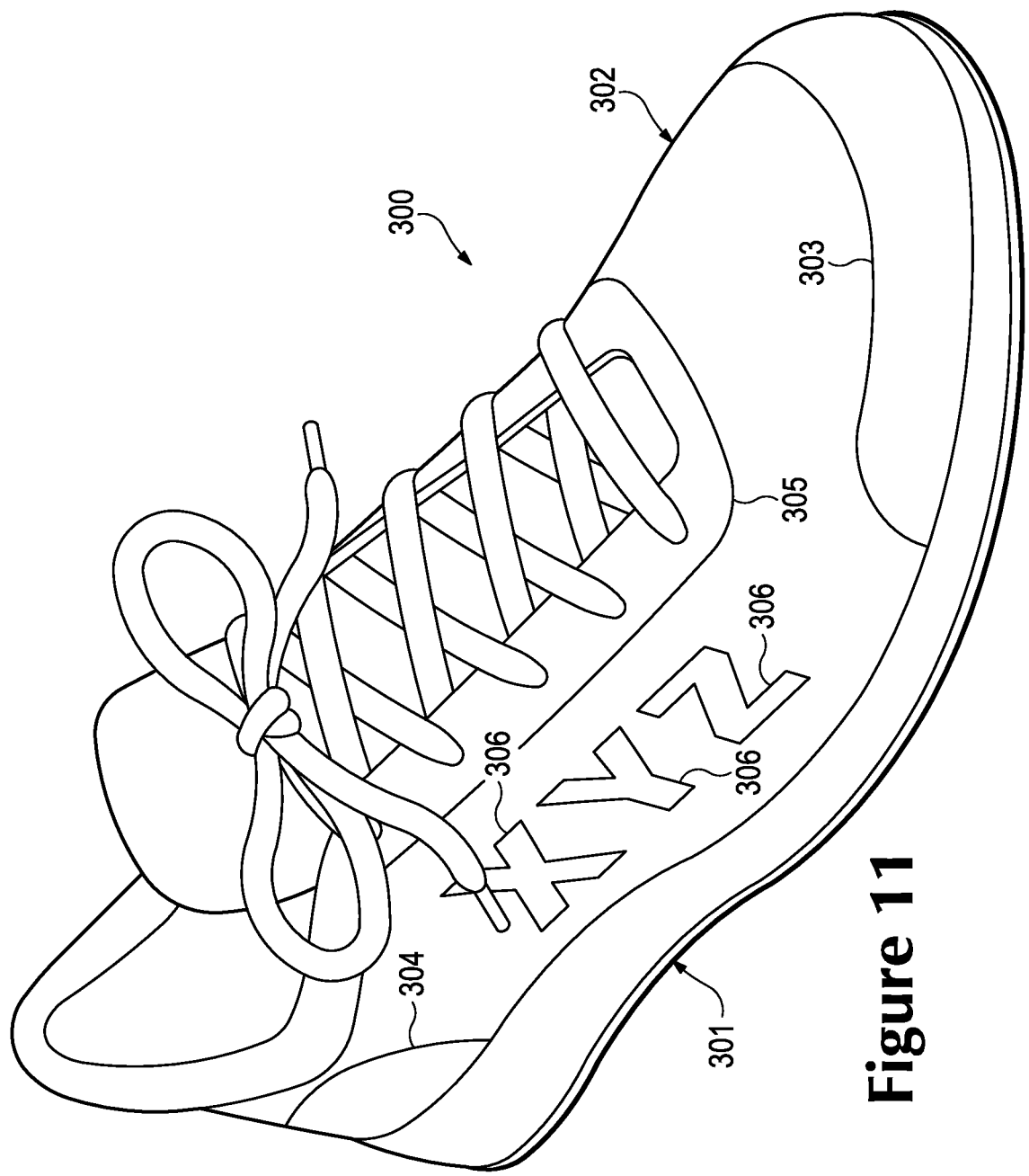
FIG. 11 is a perspective view of an article of footwear.
Figure 12:
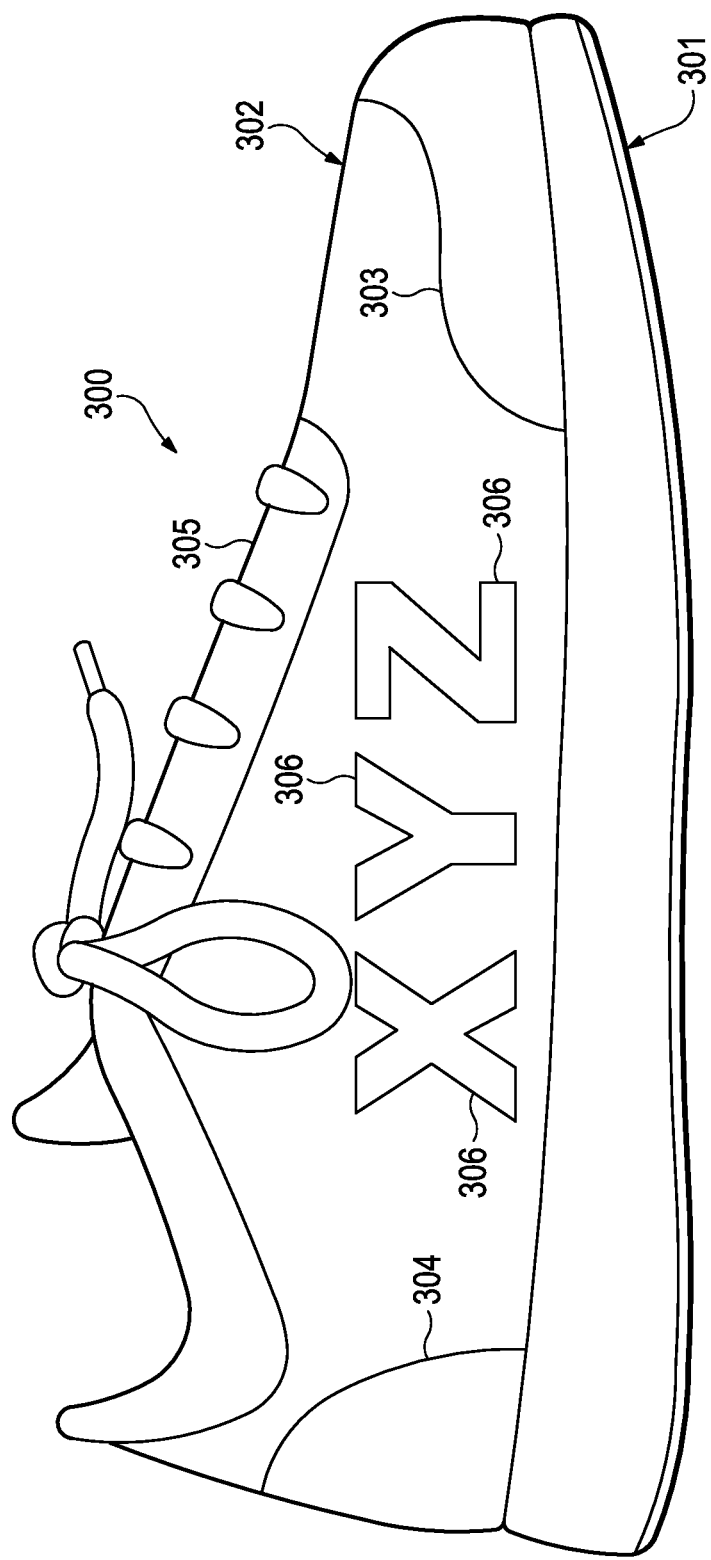
FIG. 12 is a lateral side elevational view of the article of footwear.
Figure 13:
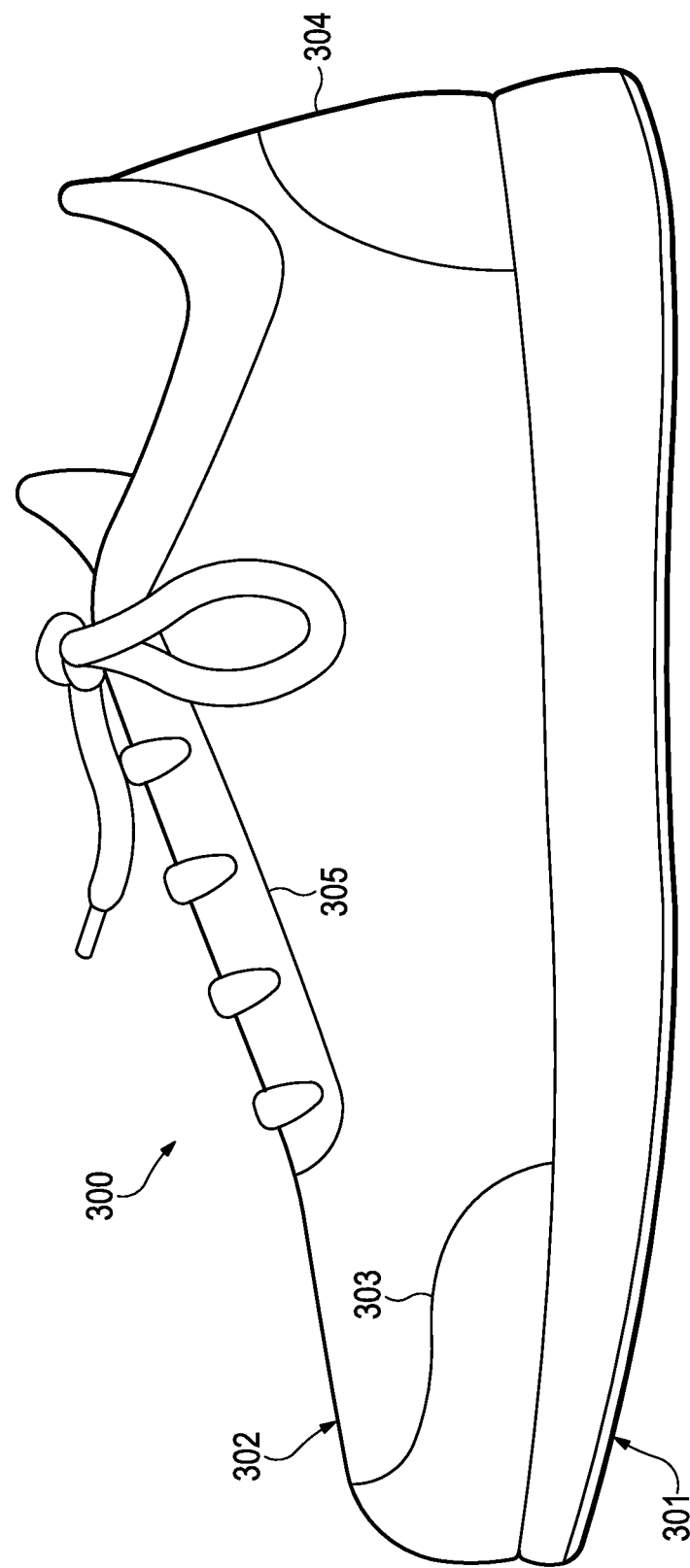
FIG. 13 is a medial side elevational view of the article of footwear.

Another article of apparel, footwear 300, is depicted in FIGS. 11-13 as including a sole structure 301 and an upper 302. Although footwear 300 is depicted as having a configuration that is suitable for running, the concepts of knit component bonding may be applied to a wide range of athletic footwear styles, including basketball shoes, biking shoes, cross-training shoes, football shoes, golf shoes, hiking shoes and boots, ski and snowboarding boots, soccer shoes, tennis shoes, and walking shoes, for example. Concepts associated with knit component bonding may also be utilized with footwear styles that are generally considered to be non-athletic, including dress shoes, loafers, and sandals. Accordingly, knit component bonding may be utilized with a wide variety of footwear styles.

Sole structure 301 is secured to upper 302 and extends between the foot and the ground when footwear 300 is worn. In general, sole structure 301 may have any conventional or non-conventional configuration. Upper 302 provides a structure for securely and comfortably receiving a foot of a wearer. More particularly, the various elements of upper 302 generally define a void within footwear 300 for receiving and securing the foot relative to sole structure 301. Surfaces of the void within upper 302 are shaped to accommodate the foot and extend over the instep and toe areas of the foot, along the medial and lateral sides of the foot, under the foot, and around the heel area of the foot. In this configuration, at least an exterior surface of upper 302 may be formed from a textile similar to knit component 110. That is, the textile forming the exterior surface may be at least partially formed from a yarn incorporating a fusible material, which has properties similar to fusible yarn 114. Moreover, the fusible material may be located on at least a portion of the exterior surface. The textile may also be at least partially formed from a yarn incorporating a non-fusible material, which has properties similar to non-fusible yarn 113.

Given the configuration of footwear 300 discussed above, various components 303-306 may be secured to the textile of upper 302 through knit component bonding. As an example, component 303 is secured to a forefoot area of upper 302 and may be a polymer or leather sheet that forms a wear resistant toe guard extending from a lateral side to a medial side of footwear 300. Component 304 is located around a heel region of footwear 300 and extends from the lateral side to the medial side of footwear 300 to form a heel counter that will resist lateral movements of the foot during walking, running, and other ambulatory activities. Although component 304 is secured to the exterior surface of upper 302, component 304 may also be secured to the interior surface if a fusible material is present at the interior surface. Various polymer sheets and plates, for example, may be utilized for component 304. Component 305 may also be a polymer or leather sheet that extends around a throat area of upper 302 to reinforce lace apertures due to tension in a lace. Additionally, three components 306 forming the characters "XYZ" are located on the lateral side of upper 302 to represent a trademark or other indicia. Accordingly, the general concepts of knit component bonding may be utilized in footwear 300 to impart a variety of benefits.

In the configuration of footwear 300 disclosed above, the textile forming the exterior surface of upper 302 is noted as being partially formed from a yarn incorporating a fusible material. In the configuration depicted in FIGS. 11-13, however, the exterior surface of upper 302 may be a base element formed from any material commonly utilized in footwear uppers. That is, the exterior surface of upper may or may not include a thermoplastic polymer material. Moreover, components 303-306 may be formed from a textile incorporating a yarn with a fusible material. In other words, components 303-306 may have the configuration of knit component 110 As such, the fusible material of components 303-306 may be utilized to form a thermal bond with upper 302.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

What is claimed is:

1. A process for forming an article, the process comprising:
   arranging a first component, a second component, and a third component to form a stacked configuration so that the third component is positioned between the first component and the second component, the first component comprising a first non-woven textile, the second component comprising a second non-woven textile, and the third component comprising a thermoplastic polymer material on a first surface that is adjacent the first component, a second surface of the third component being opposite the first surface and adjacent the second component; and
   applying heat and compression to at least a first region of the first component to fuse the first region with the third component, wherein the third component is adjacent to and unfused with a second region of the first component after the application of heat and compression.

2. The process for forming the article of claim 1, wherein based on application of heat to the first component, the thermoplastic polymer material is at least softened, and, upon compression, the thermoplastic polymer material engages with the first region of the first component.

3. The process for forming the article of claim 1 further comprising, cooling the third component fused with the first region of the first component.

4. The process for forming the article of claim 1, wherein the third component comprises the thermoplastic polymer material on the second surface.

5. The process for forming the article of claim 1, wherein the third component is fused to at least a portion of the second component.

6. The process for forming the article of claim 1, wherein one or more of text or a trademark is visible at a surface of the first component.

7. The process for forming the article of claim 1, wherein the article is an article of apparel.

8. The process of claim 7, wherein the article of apparel comprises an upper for a footwear article.

9. The process of claim 7, wherein the article of apparel comprises a shirt or pants.

* * * * *